(12) United States Patent
Chhabra et al.

(10) Patent No.: US 10,223,298 B2
(45) Date of Patent: Mar. 5, 2019

(54) URGENCY BASED REORDERING FOR PRIORITY ORDER SERVICING OF MEMORY REQUESTS

(71) Applicants: Siddhartha Chhabra, Hillsboro, OR (US); Men Long, Beaverton, OR (US); Carlos Cornelas Ornelas, Guadalajara (MX); Edgar Borrayo, Zapopan (MX); Alpa T. Narendra Trivedi, Hillsboro, OR (US)

(72) Inventors: Siddhartha Chhabra, Hillsboro, OR (US); Men Long, Beaverton, OR (US); Carlos Cornelas Ornelas, Guadalajara (MX); Edgar Borrayo, Zapopan (MX); Alpa T. Narendra Trivedi, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 32 days.

(21) Appl. No.: 15/376,442

(22) Filed: Dec. 12, 2016

(65) Prior Publication Data

US 2018/0165229 A1    Jun. 14, 2018

(51) Int. Cl.
  *G06F 13/16*    (2006.01)
  *G06F 13/18*    (2006.01)
(52) U.S. Cl.
  CPC ...... *G06F 13/1626* (2013.01); *G06F 13/1642* (2013.01); *G06F 13/18* (2013.01)

(58) Field of Classification Search
  CPC .. G06F 13/1626; G06F 13/1642; G06F 13/18; G06F 13/1605; G06F 3/0659
  See application file for complete search history.

(56) References Cited

U.S. PATENT DOCUMENTS

| | | | |
|---|---|---|---|
| 2009/0049256 A1* | 2/2009 | Hughes | G06F 13/1626 711/158 |
| 2010/0262730 A1* | 10/2010 | Jibbe | G06F 3/0613 710/40 |
| 2011/0131385 A1* | 6/2011 | Henriksson | G06F 13/1642 711/158 |
| 2014/0195743 A1* | 7/2014 | Fleischer | G06F 13/1663 711/151 |
| 2016/0117118 A1* | 4/2016 | Martinez | G06F 3/0611 711/162 |
| 2017/0293578 A1* | 10/2017 | Hower | G06F 12/0811 |

* cited by examiner

*Primary Examiner* — Yaima Rigol
(74) *Attorney, Agent, or Firm* — Womble Bond Dickinson (US) LLP

(57) ABSTRACT

Embodiments of the invention include a machine-readable medium having stored thereon instructions, which if performed by a machine causes the machine to perform a method that includes assigning an urgency of requests based on a priority level for incoming requests and associated entries in at least one priority queue, assigning an urgency delta for anti-starvation that indicates urgency promotion to prevent starvation for the incoming requests in the at least one priority queue, determining conflict information including whether an incoming request is dependent on any request already present in the at least one queue, determining all contending requests within the at least one priority queue during a cycle, and sending a selected contending request to a memory controller for accessing memory.

18 Claims, 23 Drawing Sheets

| 127 | 120 119 | 112 111 | 104 103 | | 24 23 | 16 15 | 8 7 | 0 |
|---|---|---|---|---|---|---|---|---|
| bbbb bbbb | bbbb bbbb | bbbb bbbb | • • • | | bbbb bbbb | bbbb bbbb | bbbb bbbb |

UNSIGNED PACKED BYTE REPRESENTATION 344

| 127 | 120 119 | 112 111 | 104 103 | | 24 23 | 16 15 | 8 7 | 0 |
|---|---|---|---|---|---|---|---|---|
| sbbb bbbb | sbbb bbbb | sbbb bbbb | • • • | | sbbb bbbb | sbbb bbbb | sbbb bbbb |

SIGNED PACKED BYTE REPRESENTATION 345

| 127 | 112 111 | | 16 15 | 0 |
|---|---|---|---|---|
| wwww wwww wwww wwww | • • • | | wwww wwww wwww wwww |

UNSIGNED PACKED WORD REPRESENTATION 346

| 127 | 112 111 | | 16 15 | 0 |
|---|---|---|---|---|
| swww wwww wwww wwww | • • • | | swww wwww wwww wwww |

SIGNED PACKED WORD REPRESENTATION 347

| 127 | 92 91 | 32 31 | 0 |
|---|---|---|---|
| dddd dddd dddd dddd dddd dddd dddd dddd | • • • | dddd dddd dddd dddd dddd dddd dddd dddd |

UNSIGNED PACKED DOUBLEWORD REPRESENTATION 348

| 127 | 92 91 | 32 31 | 0 |
|---|---|---|---|
| sddd dddd dddd dddd dddd dddd dddd dddd | • • • | sddd dddd dddd dddd dddd dddd dddd dddd |

SIGNED PACKED DOUBLEWORD REPRESENTATION 349

FIG. 3C

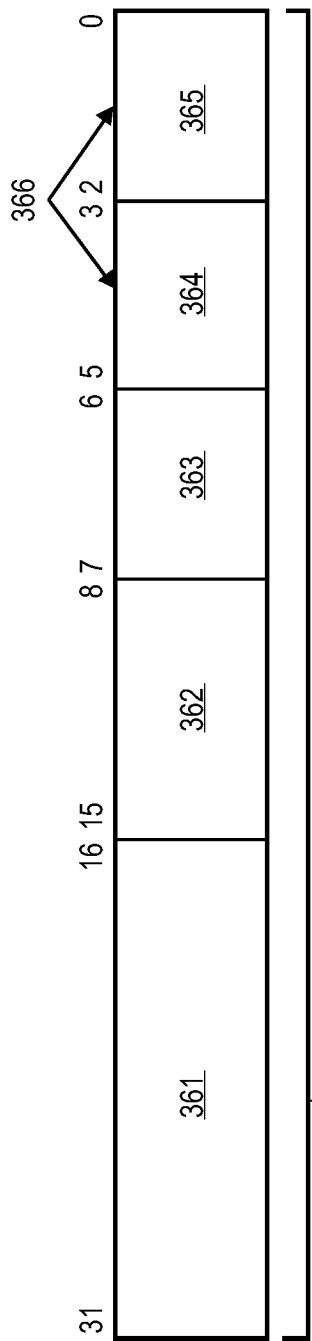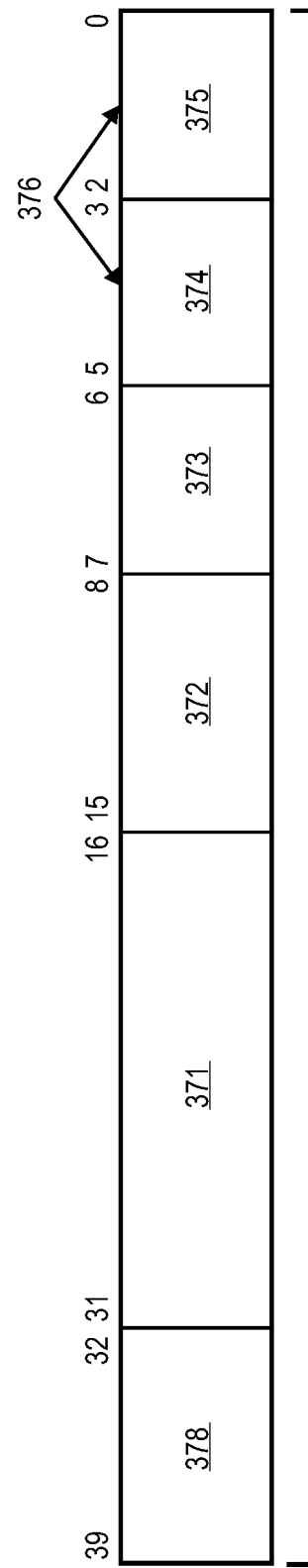

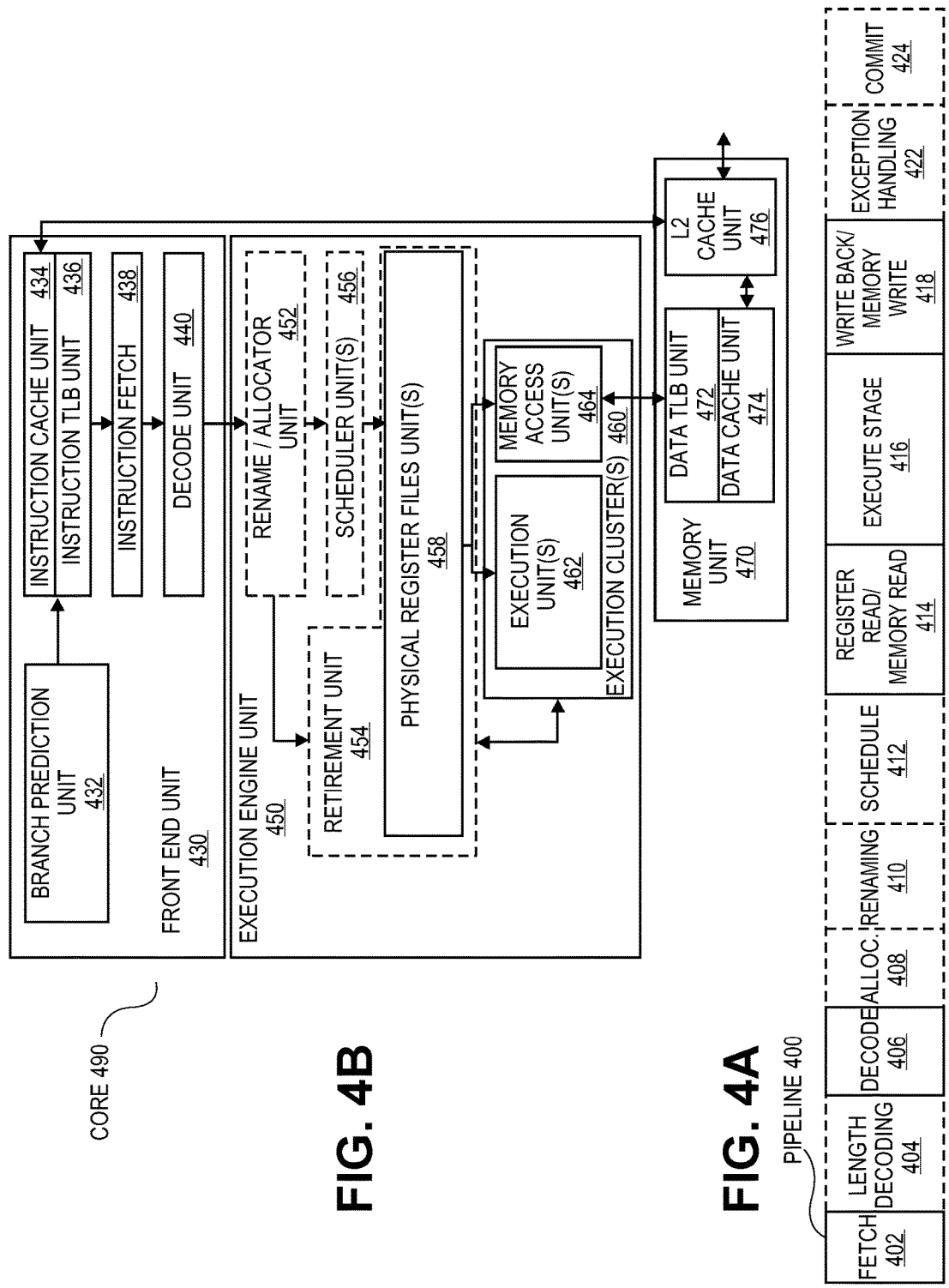

URGENCY BASED REORDERING FOR PRIORITY ORDER SERVICING OF MEMORY REQUESTS

FIELD OF THE INVENTION

The present disclosure pertains to the field of processing logic, microprocessors, and associated instruction set architecture that, when executed by the processor or other processing logic, perform logical, mathematical, or other functional operations including urgency based reordering for priority order servicing of memory requests.

DESCRIPTION OF RELATED ART

A memory path aggregator aggregates memory traffic from various request sources and arbitrates between these requests to determine the request to send to the memory for servicing. However, with requests getting buffered in the aggregator to allow for arbitration between the various memory sources, a reordering algorithm is required to ensure deadline critical requests get serviced first.

However, traditional priority-aware reordering algorithms use the priority or deadline alone to pick a winner amongst the available ready requests. With traditional priority reordering algorithms, a request dependent on a low-priority request can stay blocked till the low-priority request is serviced. This can result in a high-priority request staying blocked, potentially missing its deadline which has an adverse effect on system performance.

DESCRIPTION OF THE FIGURES

Embodiments are illustrated by way of example and not limitation in the Figures of the accompanying drawings:

FIG. 3C illustrates packed data types according to one embodiment;

FIG. 3D illustrates an instruction encoding according to one embodiment;

FIG. 3E illustrates an instruction encoding according to one embodiment;

FIG. 4A illustrates elements of a processor micro-architecture according to one embodiment;

FIG. 4B illustrates elements of a processor micro-architecture according to one embodiment;

DETAILED DESCRIPTION

Figure 1A:
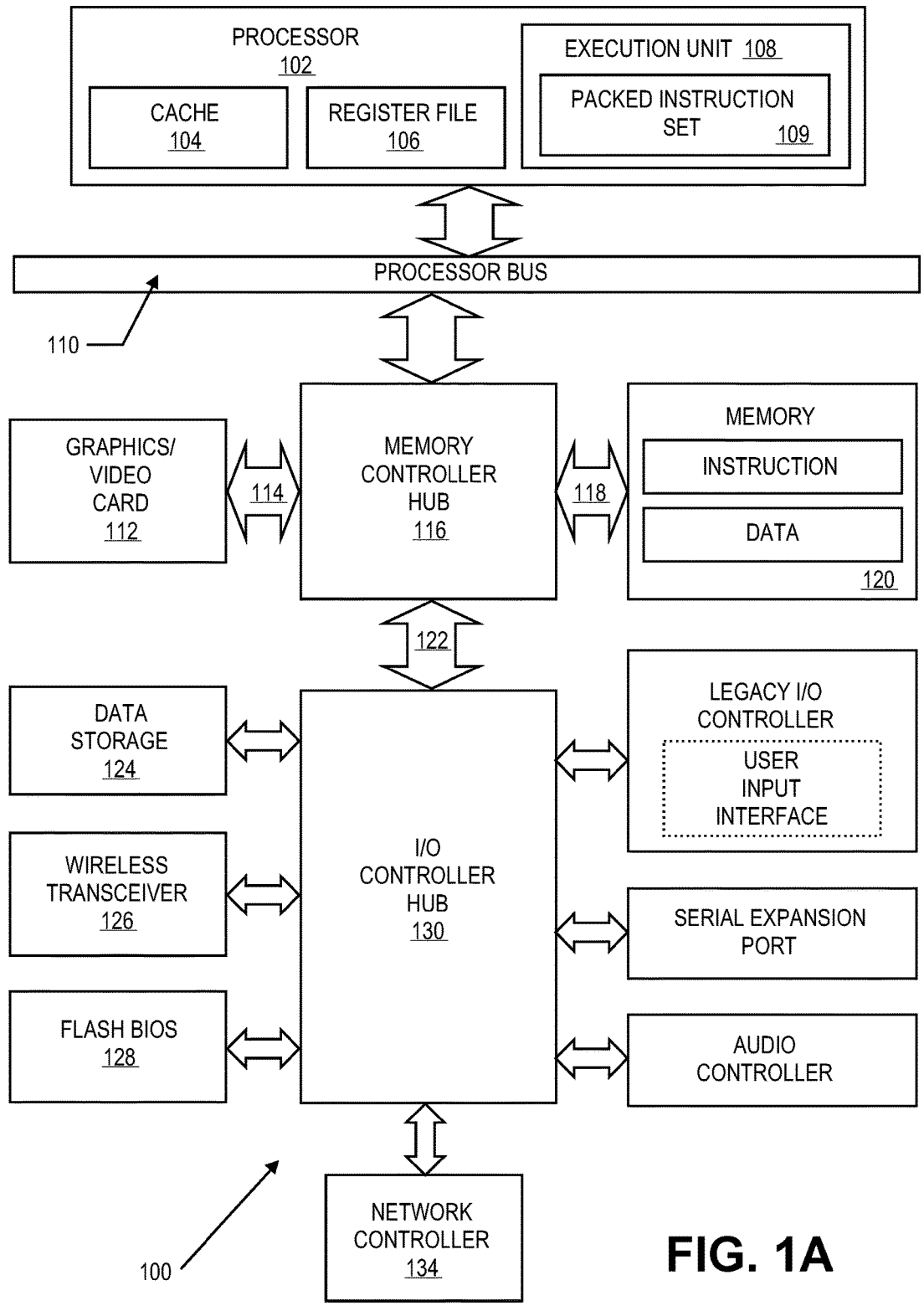
FIG. 1A is a block diagram of a system according to one embodiment.

The following description describes processing logic to perform urgency based reordering for priority order servicing of memory requests within or in association with a processor, computer system, or other processing apparatus. In the following description, numerous specific details such as processing logic, processor types, micro-architectural conditions, events, enablement mechanisms, and the like are set forth in order to provide a more thorough understanding of embodiments of the present invention. It will be appreciated, however, by one skilled in the art that the invention may be practiced without such specific details. Additionally, some well known structures, circuits, and the like have not been shown in detail to avoid unnecessarily obscuring embodiments of the present invention.

Although the following embodiments are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Although the below examples describe instruction handling and distribution in the context of execution units and logic circuits, other embodiments of the present invention can be accomplished by way of a data or instructions stored on a machine-readable, tangible medium, which when performed by a machine cause the machine to perform functions consistent with at least one embodiment of the invention. In one embodiment, functions associated with embodiments of the present invention are embodied in machine-executable instructions. The instructions can be used to cause a general-purpose or special-purpose processor that is programmed with the instructions to perform the steps of the present invention. Embodiments of the present invention may be provided as a computer program product or software which may include a machine or computer-readable medium having stored thereon instructions which may be used to program a computer (or other electronic devices) to perform one or more operations according to embodiments of the present invention. Alternatively, steps of embodiments of the present invention might be performed by specific hardware components that contain fixed-function logic for performing the steps, or by any combination of programmed computer components and fixed-function hardware components.

Instructions used to program logic to perform embodiments of the invention can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

In modern processors, a number of different execution units are used to process and execute a variety of code and instructions. Not all instructions are created equal as some are quicker to complete while others can take a number of clock cycles to complete. The faster the throughput of instructions, the better the overall performance of the processor. Thus it would be advantageous to have as many instructions execute as fast as possible. However, there are certain instructions that have greater complexity and require more in terms of execution time and processor resources. For example, there are floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which includes processor logic and circuits used to implement one or more instruction sets. Accordingly, processors with different micro-architectures can share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

In one embodiment, an instruction may include one or more instruction formats. In one embodiment, an instruction format may indicate various fields (number of bits, location of bits, etc.) to specify, among other things, the operation to be performed and the operand(s) on which that operation is to be performed. Some instruction formats may be further broken defined by instruction templates (or sub formats). For example, the instruction templates of a given instruction format may be defined to have different subsets of the instruction format's fields and/or defined to have a given field interpreted differently. In one embodiment, an instruction is expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that can logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type are referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data are generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

FIG. 1A is a block diagram of an exemplary computer system formed with a processor that includes execution units to execute an instruction in accordance with one embodiment of the present invention. System 100 includes a component, such as a processor 102 to employ execution units including logic to perform algorithms for process data, in accordance with the present invention, such as in the embodiment described herein. System 100 is representative of processing systems based on the PENTIUM, CORE, Xeon, and/or Atom microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

FIG. 1A is a block diagram of a computer system 100 formed with a processor 102 that includes one or more execution units 108 to perform an algorithm to perform at least one instruction in accordance with one embodiment of the present invention. One embodiment may be described in the context of a single processor desktop or server system, but alternative embodiments can be included in a multiprocessor system. System 100 is an example of a 'hub' system architecture. The computer system 100 includes a processor 102 to process data signals. The processor 102 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that can transmit data signals between the processor 102 and other components in the system 100. The elements of system 100 perform their conventional functions that are well known to those familiar with the art.

In one embodiment, the processor 102 includes a Level 1 (L1) internal cache memory 104. Depending on the architecture, the processor 102 can have a single internal cache or multiple levels of internal cache. Alternatively, in another embodiment, the cache memory can reside external to the processor 102. Other embodiments can also include a combination of both internal and external caches depending on the particular implementation and needs. Register file 106 can store different types of data in various registers including integer registers, floating point registers, status registers, and instruction pointer register.

Execution unit 108, including logic to perform integer and floating point operations, also resides in the processor 102. The processor 102 also includes a microcode (ucode) ROM that stores microcode for certain macroinstructions. For one embodiment, execution unit 108 includes logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications can be accelerated and executed more efficiently by using the full width of a processor's data bus for performing operations on packed data. This can eliminate the need to transfer smaller units of data across the processor's data bus to perform one or more operations one data element at a time.

Alternate embodiments of an execution unit 108 can also be used in micro controllers, embedded processors, graphics devices, DSPs, and other types of logic circuits. System 100 includes a memory 120. Memory 120 can be a dynamic random access memory (DRAM) device, a static random access memory (SRAM) device, flash memory device, or other memory device. Memory 120 can store instructions and/or data represented by data signals that can be executed by the processor 102.

In one embodiment a memory controller hub (MCH) 116 is coupled to the processor bus 110 and memory 120. The processor 102 can communicate to the MCH 116 via a processor bus 110. The MCH 116 is a system logic chip that provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

In some embodiments the system I/O 122 is a proprietary hub interface bus that is used to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 1B:
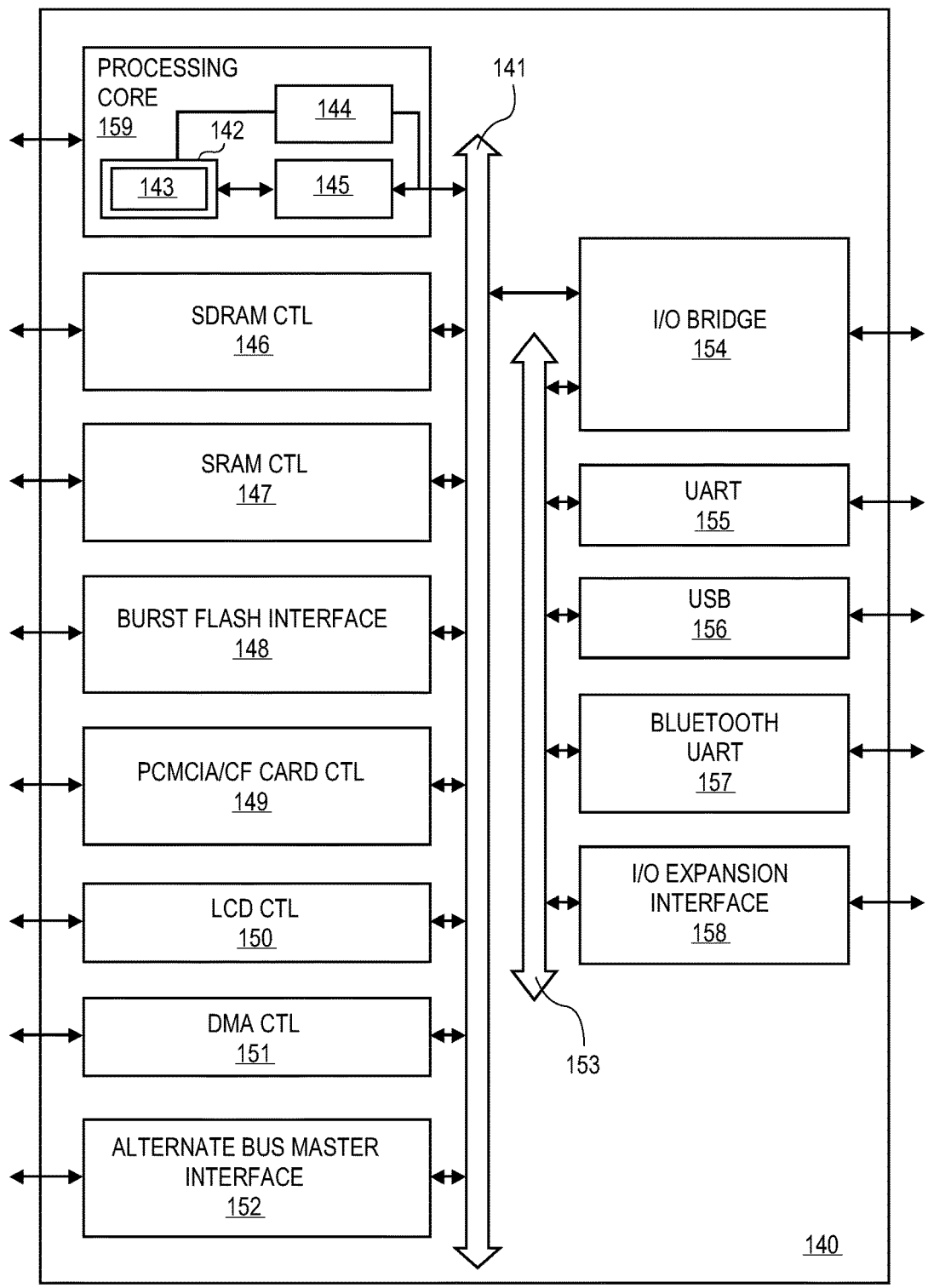
FIG. 1B is a block diagram of a system according to one embodiment.

FIG. 1B illustrates a data processing system 140 which implements the principles of one embodiment of the present invention. It will be readily appreciated by one of skill in the art that the embodiments described herein can be used with alternative processing systems without departure from the scope of embodiments of the invention.

The data processing system 140 comprises a processing core 159 capable of performing at least one instruction in accordance with one embodiment. For one embodiment, processing core 159 represents a processing unit of any type of architecture, including but not limited to CISC, RISC or VLIW type architecture. Processing core 159 may also be suitable for manufacture in one or more process technologies and by being represented on a machine readable media in sufficient detail, may be suitable to facilitate said manufacture.

Processing core 159 comprises an execution unit 142, a set of register file(s) 145, and a decoder 144. Processing core 159 also includes additional circuitry (not shown) which is not necessary to the understanding of embodiments of the present invention. Execution unit 142 is used for executing instructions received by processing core 159. In addition to performing typical processor instructions, execution unit 142 can perform instructions in packed instruction set 143 for performing operations on packed data formats. Packed instruction set 143 includes instructions for performing embodiments of the invention and other packed instructions. Execution unit 142 is coupled to register file 145 by an internal bus. Register file 145 represents a storage area on processing core 159 for storing information, including data. As previously mentioned, it is understood that the storage area used for storing the packed data is not critical. Execution unit 142 is coupled to decoder 144. Decoder 144 is used for decoding instructions received by processing core 159 into control signals and/or microcode entry points. In response to these control signals and/or microcode entry points, execution unit 142 performs the appropriate operations. In one embodiment, the decoder is used to interpret the opcode of the instruction, which will indicate what operation should be performed on the corresponding data indicated within the instruction.

Processing core 159 is coupled with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PCMCIA)/compact flash (CF) card control 149, liquid crystal display (LCD) control 150, direct memory access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 140 provides for mobile, network and/or wireless communications and a processing core 159 capable of performing SIMD operations including a text string comparison operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 1C:
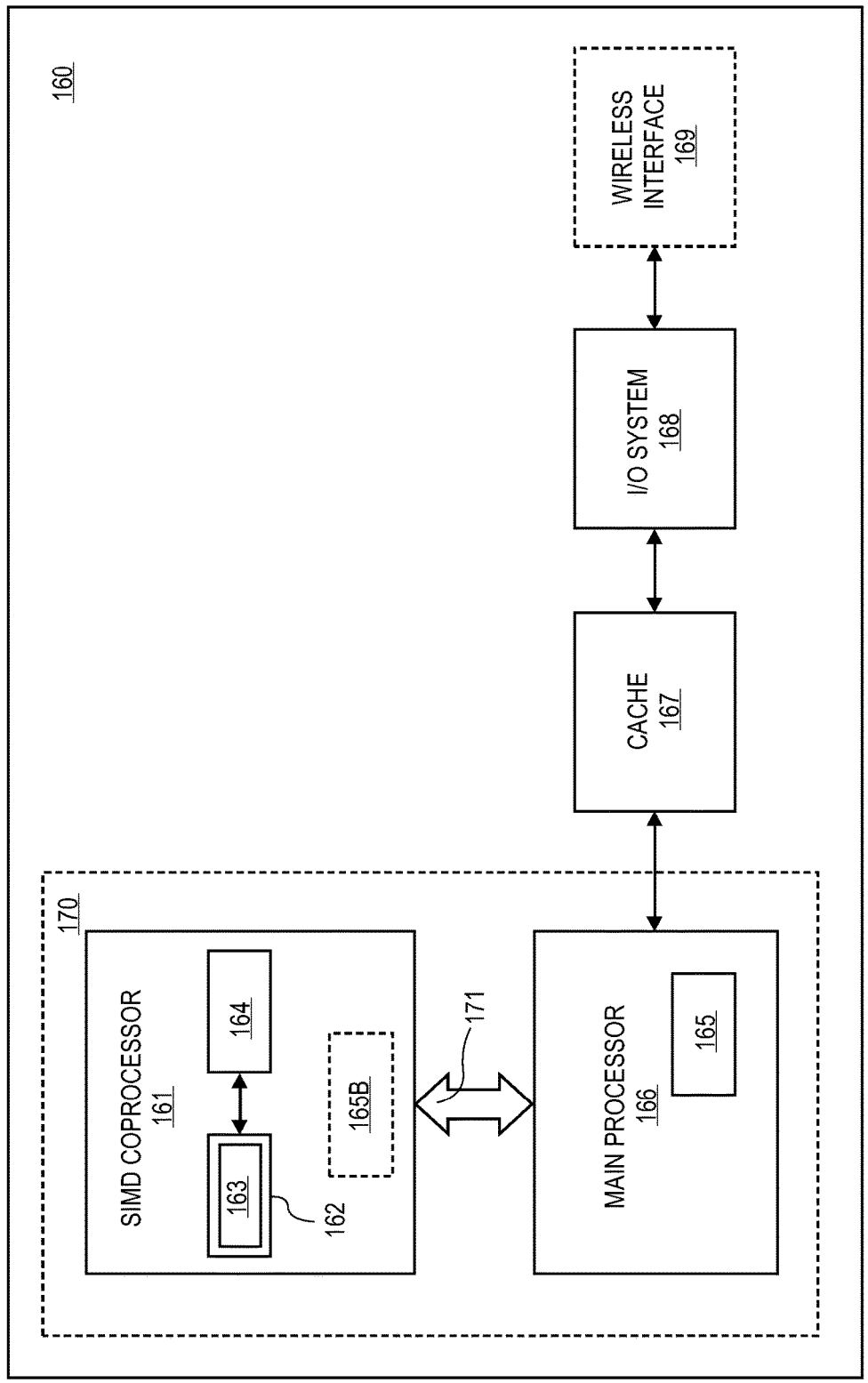
FIG. 1C is a block diagram of a system according to one embodiment.

FIG. 1C illustrates yet alternative embodiments of a data processing system capable of performing SIMD text string comparison operations. In accordance with one alternative embodiment, data processing system 160 may include a main processor 166, a SIMD coprocessor 161, a cache memory 167, and an input/output system 168. The input/output system 168 may optionally be coupled to a wireless interface 169. SIMD coprocessor 161 is capable of performing operations including instructions in accordance with one embodiment. Processing core 170 may be suitable for manufacture in one or more process technologies and by being represented on a machine readable media in sufficient detail, may be suitable to facilitate the manufacture of all or part of data processing system 160 including processing core 170.

For one embodiment, SIMD coprocessor 161 comprises an execution unit 162 and a set of register file(s) 164. One embodiment of main processor 165 comprises a decoder 165 to recognize instructions of instruction set 163 including instructions in accordance with one embodiment for execution by execution unit 162. For alternative embodiments, SIMD coprocessor 161 also comprises at least part of decoder 165B to decode instructions of instruction set 163. Processing core 170 also includes additional circuitry (not shown) which is not necessary to the understanding of embodiments of the present invention.

In operation, the main processor 166 executes a stream of data processing instructions that control data processing operations of a general type including interactions with the cache memory 167, and the input/output system 168. Embedded within the stream of data processing instructions are SIMD coprocessor instructions. The decoder 165 of main processor 166 recognizes these SIMD coprocessor instructions as being of a type that should be executed by an attached SIMD coprocessor 161. Accordingly, the main processor 166 issues these SIMD coprocessor instructions (or control signals representing SIMD coprocessor instructions) on the coprocessor bus 171 where from they are received by any attached SIMD coprocessors. In this case, the SIMD coprocessor 161 will accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. For one embodiment of processing core 170, main processor 166, and a SIMD coprocessor 161 are integrated into a single processing core 170 comprising an execution unit 162, a set of register file(s) 164, and a decoder 165 to recognize instructions of instruction set 163 including instructions in accordance with one embodiment.

Figure 2:
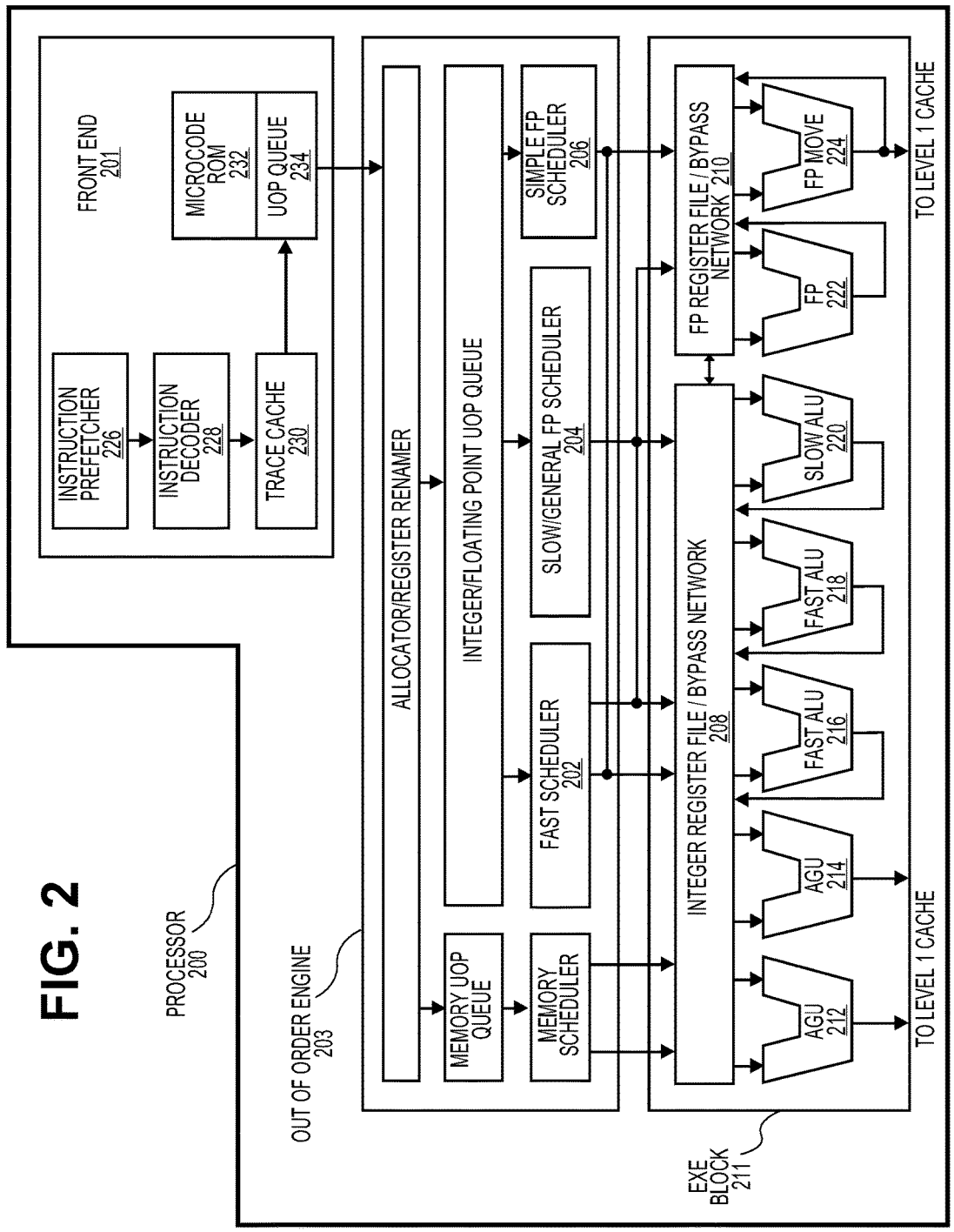
FIG. 2 is a block diagram of a processor according to one embodiment.

FIG. 2 is a block diagram of the micro-architecture for a processor 200 that includes logic circuits to perform instructions in accordance with one embodiment of the present invention. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 201 is the part of the processor 200 that fetches instructions to be executed and prepares them to be used later in the processor pipeline. The front end 201 may include several units. In one embodiment, the instruction prefetcher 226 fetches instructions from memory and feeds them to an instruction decoder 228 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 230 takes decoded uops and assembles them into program ordered sequences or traces in the uop queue 234 for execution. When the trace cache 230 encounters a complex instruction, the microcode ROM 232 provides the uops needed to complete the operation.

Some instructions are converted into a single micro-op, whereas others need several micro-ops to complete the full operation. In one embodiment, if more than four micro-ops are needed to complete a instruction, the decoder 228 accesses the microcode ROM 232 to do the instruction. For one embodiment, an instruction can be decoded into a small number of micro ops for processing at the instruction decoder 228. In another embodiment, an instruction can be stored within the microcode ROM 232 should a number of micro-ops be needed to accomplish the operation. The trace cache 230 refers to a entry point programmable logic array (PLA) to determine a correct micro-instruction pointer for reading the micro-code sequences to complete one or more instructions in accordance with one embodiment from the micro-code ROM 232. After the microcode ROM 232 finishes sequencing micro-ops for an instruction, the front end 201 of the machine resumes fetching micro-ops from the trace cache 230.

The out-of-order execution engine 203 is where the instructions are prepared for execution. The out-of-order execution logic has a number of buffers to smooth out and reorder the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. The uop schedulers 202, 204, 206, determine when a uop is ready to execute based on the readiness of their dependent input register operand sources and the availability of the execution resources the uops need to complete their operation. The fast scheduler 202 of one embodiment can schedule on each half of the main clock cycle while the other schedulers can only schedule once per main processor clock cycle. The schedulers arbitrate for the dispatch ports to schedule uops for execution.

Register files 208, 210, sit between the schedulers 202, 204, 206, and the execution units 212, 214, 216, 218, 220, 222, 224 in the execution block 211. There is a separate register file 208, 210, for integer and floating point operations, respectively. Each register file 208, 210, of one embodiment also includes a bypass network that can bypass or forward just completed results that have not yet been written into the register file to new dependent uops. The integer register file 208 and the floating point register file 210 are also capable of communicating data with the other. For one embodiment, the integer register file 208 is split into two separate register files, one register file for the low order 32 bits of data and a second register file for the high order 32 bits of data. The floating point register file 210 of one embodiment has 128 bit wide entries because floating point instructions typically have operands from 64 to 128 bits in width.

The execution block 211 contains the execution units 212, 214, 216, 218, 220, 222, 224, where the instructions are actually executed. This section includes the register files 208, 210, that store the integer and floating point data operand values that the micro-instructions need to execute.

The processor 200 of one embodiment is comprised of a number of execution units: address generation unit (AGU) 212, AGU 214, fast ALU 216, fast ALU 218, slow ALU 220, floating point ALU 222, floating point move unit 224. For one embodiment, the floating point execution blocks 222, 224, execute floating point, MMX, SIMD, and SSE, or other operations. The floating point ALU 222 of one embodiment includes a 64 bit by 64 bit floating point divider to execute divide, square root, and remainder micro-ops. For embodiments of the present invention, instructions involving a floating point value may be handled with the floating point hardware. In one embodiment, the ALU operations go to the high-speed ALU execution units 216, 218. The fast ALUs 216, 218, of one embodiment can execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For one embodiment, the integer ALUs 216, 218, 220, are described in the context of performing integer operations on 64 bit data operands. In alternative embodiments, the ALUs 216, 218, 220, can be implemented to support a variety of data bits including 16, 32, 128, 256, etc. Similarly, the floating point units 222, 224, can be implemented to support a range of operands having bits of various widths. For one embodiment, the floating point units 222, 224, can operate on 128 bits wide packed data operands in conjunction with SIMD and multimedia instructions.

In one embodiment, the uops schedulers 202, 204, 206, dispatch dependent operations before the parent load has finished executing. As uops are speculatively scheduled and executed in processor 200, the processor 200 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 3A:
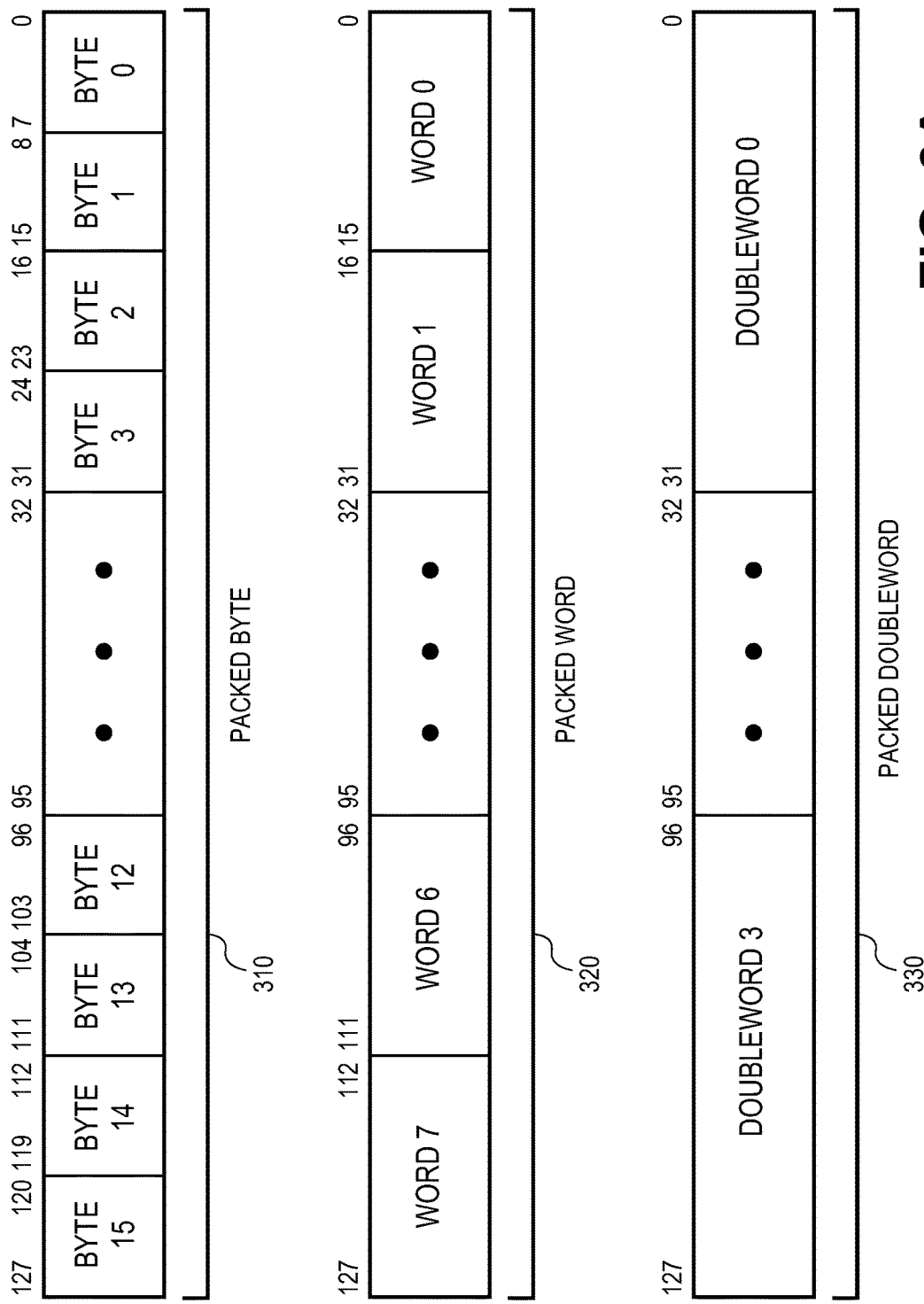
FIG. 3A illustrates packed data types according to one embodiment.

In the examples of the following figures, a number of data operands are described. FIG. 3A illustrates various packed data type representations in multimedia registers according to one embodiment of the present invention. FIG. 3A illustrates data types for a packed byte 310, a packed word 320, and a packed doubleword (dword) 330 for 128 bit wide operands. The packed byte format 310 of this example is 128 bits long and contains sixteen packed byte data elements. A byte is defined here as 8 bits of data. Information for each byte data element is stored in bit 7 through bit 0 for byte 0, bit 15 through bit 8 for byte 1, bit 23 through bit 16 for byte 2, and finally bit 120 through bit 127 for byte 15. Thus, all available bits are used in the register. This storage arrangement increases the storage efficiency of the processor. As well, with sixteen data elements accessed, one operation can now be performed on sixteen data elements in parallel.

Generally, a data element is an individual piece of data that is stored in a single register or memory location with other data elements of the same length. In packed data sequences relating to SSEx technology, the number of data elements stored in a XMM register is 128 bits divided by the length in bits of an individual data element. Similarly, in packed data sequences relating to MMX and SSE technology, the number of data elements stored in an MMX register is 64 bits divided by the length in bits of an individual data element. Although the data types illustrated in FIG. 3A are 128 bit long, embodiments of the present invention can also operate with 64 bit wide or other sized operands. The packed word format 320 of this example is 128 bits long and contains eight packed word data elements. Each packed word contains sixteen bits of information. The packed doubleword format 330 of FIG. 3A is 128 bits long and contains four packed doubleword data elements. Each packed doubleword data element contains thirty two bits of information. A packed quadword is 128 bits long and contains two packed quad-word data elements.

Figure 3B:
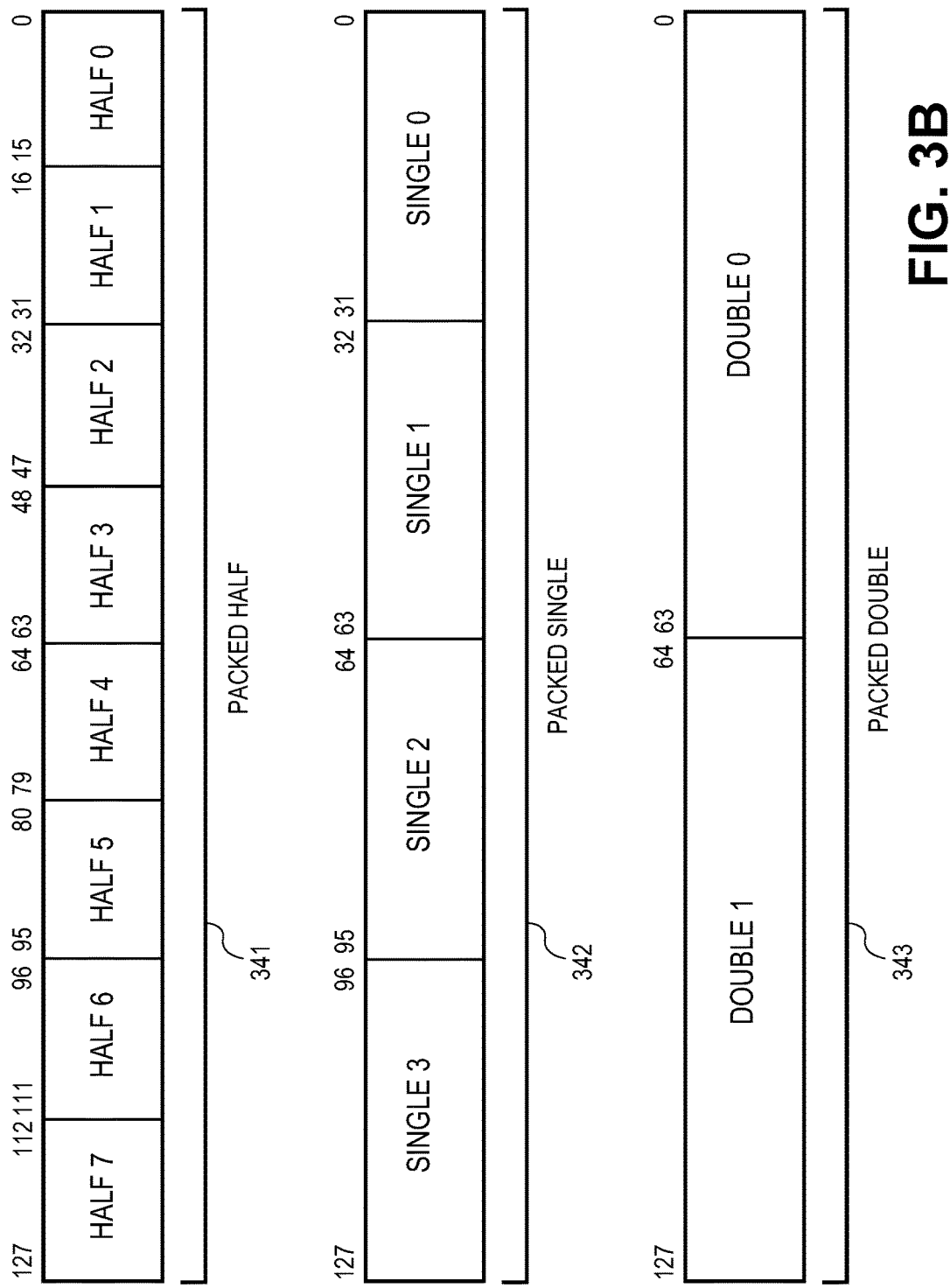
FIG. 3B illustrates packed data types according to one embodiment.

FIG. 3B illustrates alternative in-register data storage formats. Each packed data can include more than one independent data element. Three packed data formats are illustrated; packed half 341, packed single 342, and packed double 343. One embodiment of packed half 341, packed single 342, and packed double 343 contain fixed-point data elements. For an alternative embodiment one or more of packed half 341, packed single 342, and packed double 343 may contain floating-point data elements. One alternative embodiment of packed half 341 is one hundred twenty-eight bits long containing eight 16-bit data elements. One embodiment of packed single 342 is one hundred twenty-eight bits long and contains four 32-bit data elements. One embodiment of packed double 343 is one hundred twenty-eight bits long and contains two 64-bit data elements. It will be appreciated that such packed data formats may be further extended to other register lengths, for example, to 96-bits, 160-bits, 192-bits, 224-bits, 256-bits or more.

FIG. 3C illustrates various signed and unsigned packed data type representations in multimedia registers according to one embodiment of the present invention. Unsigned packed byte representation 344 illustrates the storage of an unsigned packed byte in a SIMD register. Information for each byte data element is stored in bit seven through bit zero for byte zero, bit fifteen through bit eight for byte one, bit twenty-three through bit sixteen for byte two, and finally bit one hundred twenty through bit one hundred twenty-seven for byte fifteen. Thus, all available bits are used in the register. This storage arrangement can increase the storage efficiency of the processor. As well, with sixteen data elements accessed, one operation can now be performed on sixteen data elements in a parallel fashion. Signed packed byte representation 345 illustrates the storage of a signed packed byte. Note that the eighth bit of every byte data element is the sign indicator. Unsigned packed word representation 346 illustrates how word seven through word zero are stored in a SIMD register. Signed packed word representation 347 is similar to the unsigned packed word in-register representation 346. Note that the sixteenth bit of each word data element is the sign indicator. Unsigned packed doubleword representation 348 shows how doubleword data elements are stored. Signed packed doubleword representation 349 is similar to unsigned packed doubleword in-register representation 348. Note that the necessary sign bit is the thirty-second bit of each doubleword data element.

FIG. 3D is a depiction of one embodiment of an operation encoding (opcode) format 360, having thirty-two or more bits, and register/memory operand addressing modes corresponding with a type of opcode format described in the "IA-32 Intel Architecture Software Developer's Manual Volume 2: Instruction Set Reference," which is which is available from Intel Corporation, Santa Clara, Calif. on the world-wide-web (www) at intel.com/design/litcentr. In one embodiment, and instruction may be encoded by one or more of fields 361 and 362. Up to two operand locations per instruction may be identified, including up to two source operand identifiers 364 and 365. For one embodiment, destination operand identifier 366 is the same as source operand identifier 364, whereas in other embodiments they are different. For an alternative embodiment, destination operand identifier 366 is the same as source operand identifier 365, whereas in other embodiments they are different. In one embodiment, one of the source operands identified by source operand identifiers 364 and 365 is overwritten by the results of the text string comparison operations, whereas in other embodiments identifier 364 corresponds to a source register element and identifier 365 corresponds to a destination register element. For one embodiment, operand identifiers 364 and 365 may be used to identify 32-bit or 64-bit source and destination operands.

FIG. 3E is a depiction of another alternative operation encoding (opcode) format 370, having forty or more bits. Opcode format 370 corresponds with opcode format 360 and comprises an optional prefix byte 378. An instruction according to one embodiment may be encoded by one or more of fields 378, 371, and 372. Up to two operand locations per instruction may be identified by source operand identifiers 374 and 375 and by prefix byte 378. For one embodiment, prefix byte 378 may be used to identify 32-bit or 64-bit source and destination operands. For one embodiment, destination operand identifier 376 is the same as source operand identifier 374, whereas in other embodiments they are different. For an alternative embodiment, destination operand identifier 376 is the same as source operand identifier 375, whereas in other embodiments they are different. In one embodiment, an instruction operates on one or more of the operands identified by operand identifiers 374 and 375 and one or more operands identified by the operand identifiers 374 and 375 is overwritten by the results of the instruction, whereas in other embodiments, operands identified by identifiers 374 and 375 are written to another data element in another register. Opcode formats 360 and 370 allow register to register, memory to register, register by memory, register by register, register by immediate, register to memory addressing specified in part by MOD fields 363 and 373 and by optional scale-index-base and displacement bytes.

Figure 3F:
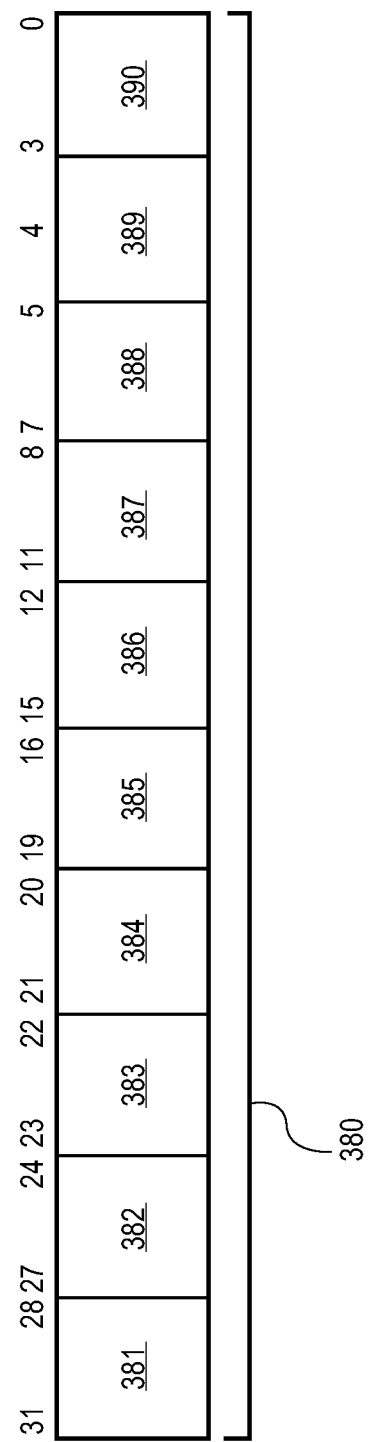
FIG. 3F illustrates an instruction encoding according to one embodiment.

Turning next to FIG. 3F, in some alternative embodiments, 64 bit single instruction multiple data (SIMD) arithmetic operations may be performed through a coprocessor data processing (CDP) instruction. Operation encoding (opcode) format 380 depicts one such CDP instruction having CDP opcode fields 382 and 389. The type of CDP instruction, for alternative embodiments, operations may be encoded by one or more of fields 383, 384, 387, and 388. Up to three operand locations per instruction may be identified, including up to two source operand identifiers 385 and 390 and one destination operand identifier 386. One embodiment of the coprocessor can operate on 8, 16, 32, and 64 bit values. For one embodiment, an instruction is performed on integer data elements. In some embodiments, an instruction may be executed conditionally, using condition field 381. For some embodiments, source data sizes may be encoded by field 383. In some embodiments, Zero (Z), negative (N), carry (C), and overflow (V) detection can be done on SIMD fields. For some instructions, the type of saturation may be encoded by field 384.

FIG. 4A is a block diagram illustrating an in-order pipeline and a register renaming stage, out-of-order issue/execution pipeline according to at least one embodiment of the invention. FIG. 4B is a block diagram illustrating an in-order architecture core and a register renaming logic, out-of-order issue/execution logic to be included in a processor according to at least one embodiment of the invention. The solid lined boxes in FIG. 4A illustrate the in-order pipeline, while the dashed lined boxes illustrates the register renaming, out-of-order issue/execution pipeline. Similarly, the solid lined boxes in FIG. 4B illustrate the in-order architecture logic, while the dashed lined boxes illustrates the register renaming logic and out-of-order issue/execution logic.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

In FIG. 4B, arrows denote a coupling between two or more units and the direction of the arrow indicates a direction of data flow between those units. FIG. 4B shows processor core 490 including a front end unit 430 coupled to an execution engine unit 450, and both are coupled to a memory unit 470.

The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to a level 2 (L2) cache unit 476 in the memory unit 470. The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 154 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 162 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5:
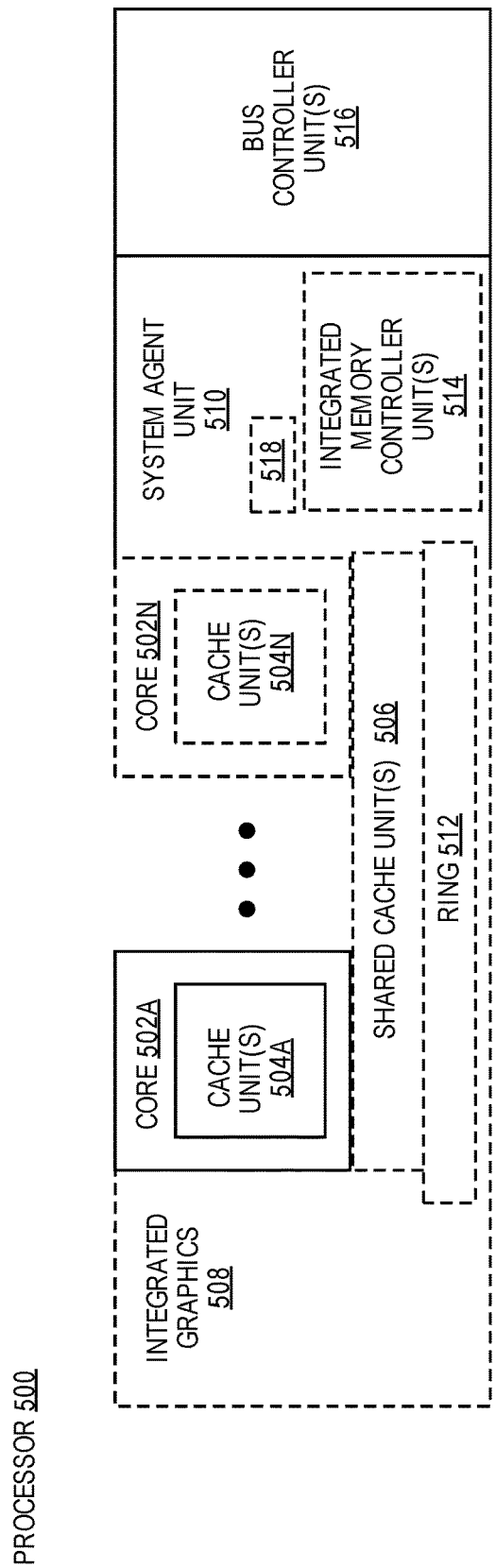
FIG. 5 is a block diagram of a processor according to one embodiment.

FIG. 5 is a block diagram of a single core processor and a multicore processor 500 with integrated memory controller and graphics according to embodiments of the invention. The solid lined boxes in FIG. 5 illustrate a processor 500 with a single core 502A, a system agent 510, a set of one or more bus controller units 516, while the optional addition of the dashed lined boxes illustrates an alternative processor 500 with multiple cores 502A-N, a set of one or more integrated memory controller unit(s) 514 in the system agent unit 510, a memory aggregator 518 (e.g., memory aggregator 1410) for urgency based reordering for priority order servicing of memory requests, and special purpose logic including integrated graphics logic 508. Each of processor cores 502A-502N includes one or more internal cache units 504A-504N. In some embodiments each processor core also has access to one or more shared cached units 506. The memory aggregator 518 can be integrated with the system agent unit 518 or located separately from the system agent unit 518.

The internal cache units 504A-504N and shared cache units 506 represent a cache memory hierarchy within the processor 500. The cache memory hierarchy is a portion of an overall memory hierarchy for the processor that includes one or more internal cache units 504A-504N, the one or more shared cache units 506, and external memory (not shown) coupled to the set of integrated memory controller units 514. The set of shared cache units 506 may include one or more mid-level caches, such as level 2 (L2), level 3 (L3), level 4 (L4), or other levels of cache, a last level cache (LLC), and/or combinations thereof. While in one embodiment a ring based interconnect unit 512 interconnects the integrated graphics logic 508, the set of shared cache units 506, and the system agent unit 510, alternative embodiments may use any number of well-known techniques for interconnecting such units.

In some embodiments, one or more of the cores 502A-N are capable of multithreading. The system agent 510 includes those components coordinating and operating cores 502A-N. The system agent unit 510 may include for example a power control unit (PCU) and a display unit. The PCU may be or include logic and components needed for regulating the power state of the cores 502A-N and the integrated graphics logic 508. The display unit is for driving one or more externally connected displays.

The cores 502A-N may be homogenous or heterogeneous in terms of architecture and/or instruction set. For example, some of the cores 502A-N may be in order while others are out-of-order. As another example, two or more of the cores 502A-N may be capable of execution the same instruction set, while others may be capable of executing only a subset of that instruction set or a different instruction set.

The processor may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the processor may be from another company, such as ARM Holdings, Ltd, MIPS, etc. The processor may be a special-purpose processor, such as, for example, a network or communication processor, compression engine, graphics processor, co-processor, embedded processor, or the like. The processor may be implemented on one or more chips. The processor 500 may be a part of and/or may be implemented on one or more substrates using any of a number of process technologies, such as, for example, BiCMOS, CMOS, or NMOS.

Figure 6:
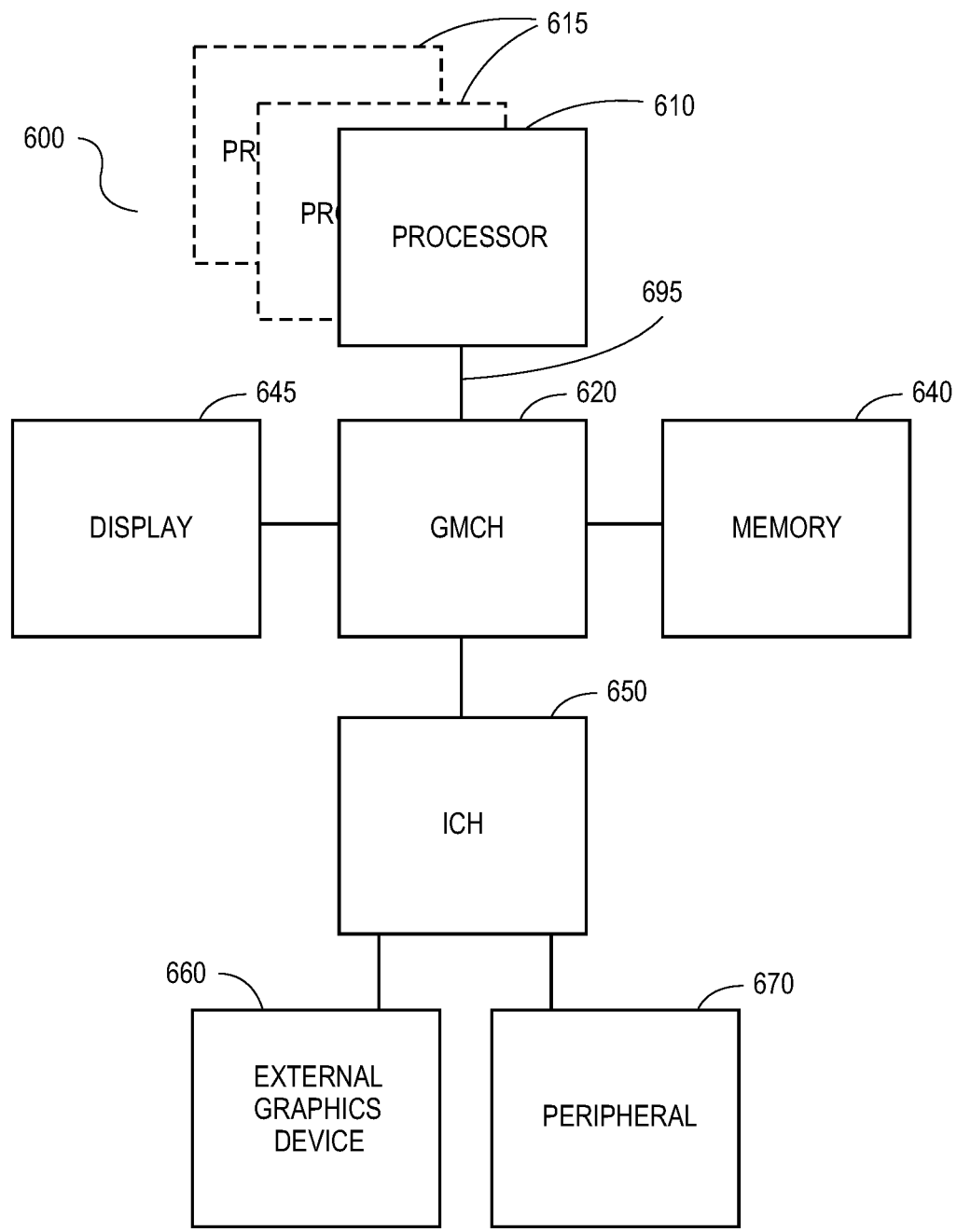
FIG. 6 is a block diagram of a computer system according to one embodiment.
Figure 7:
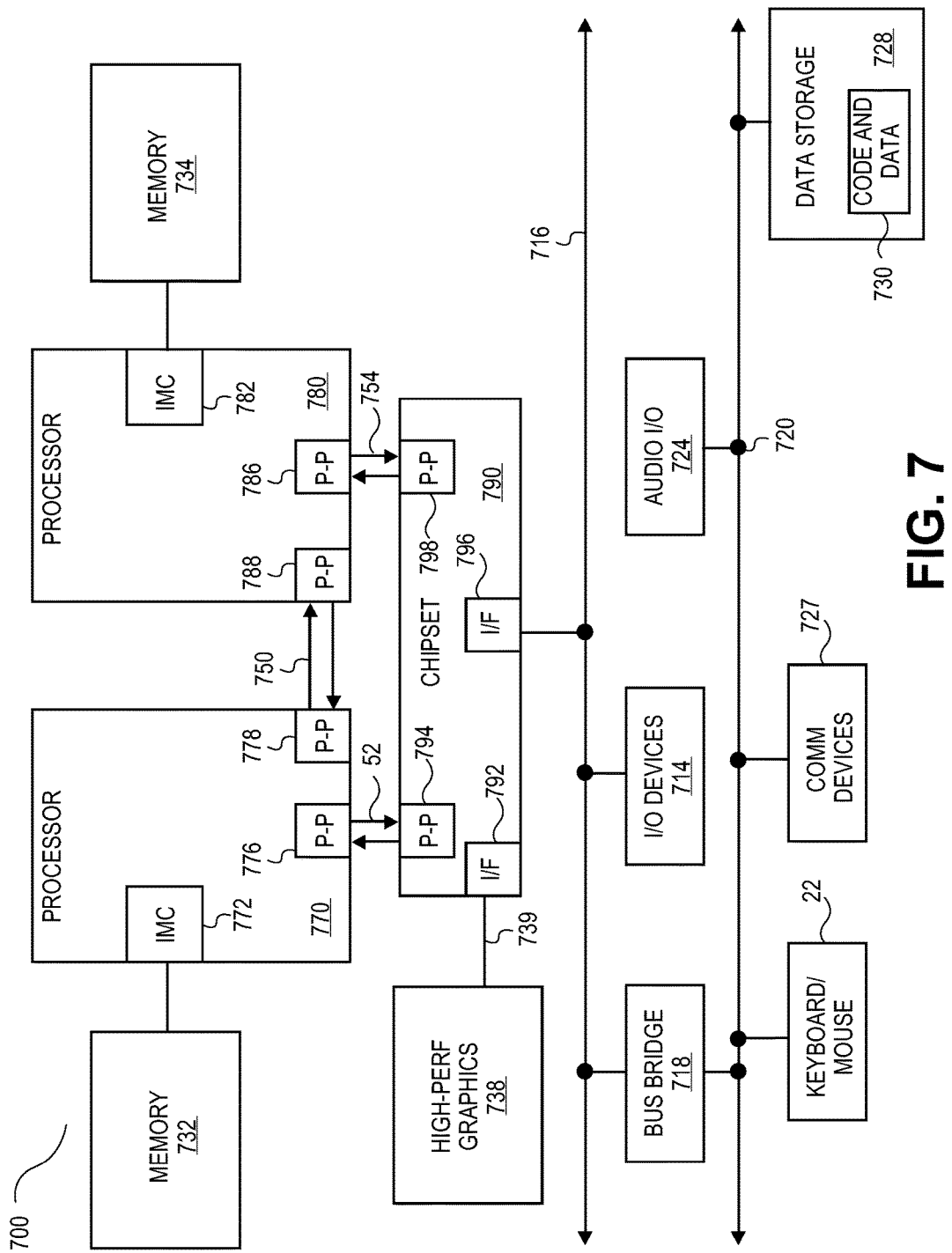
FIG. 7 is a block diagram of a computer system according to one embodiment.
Figure 8:
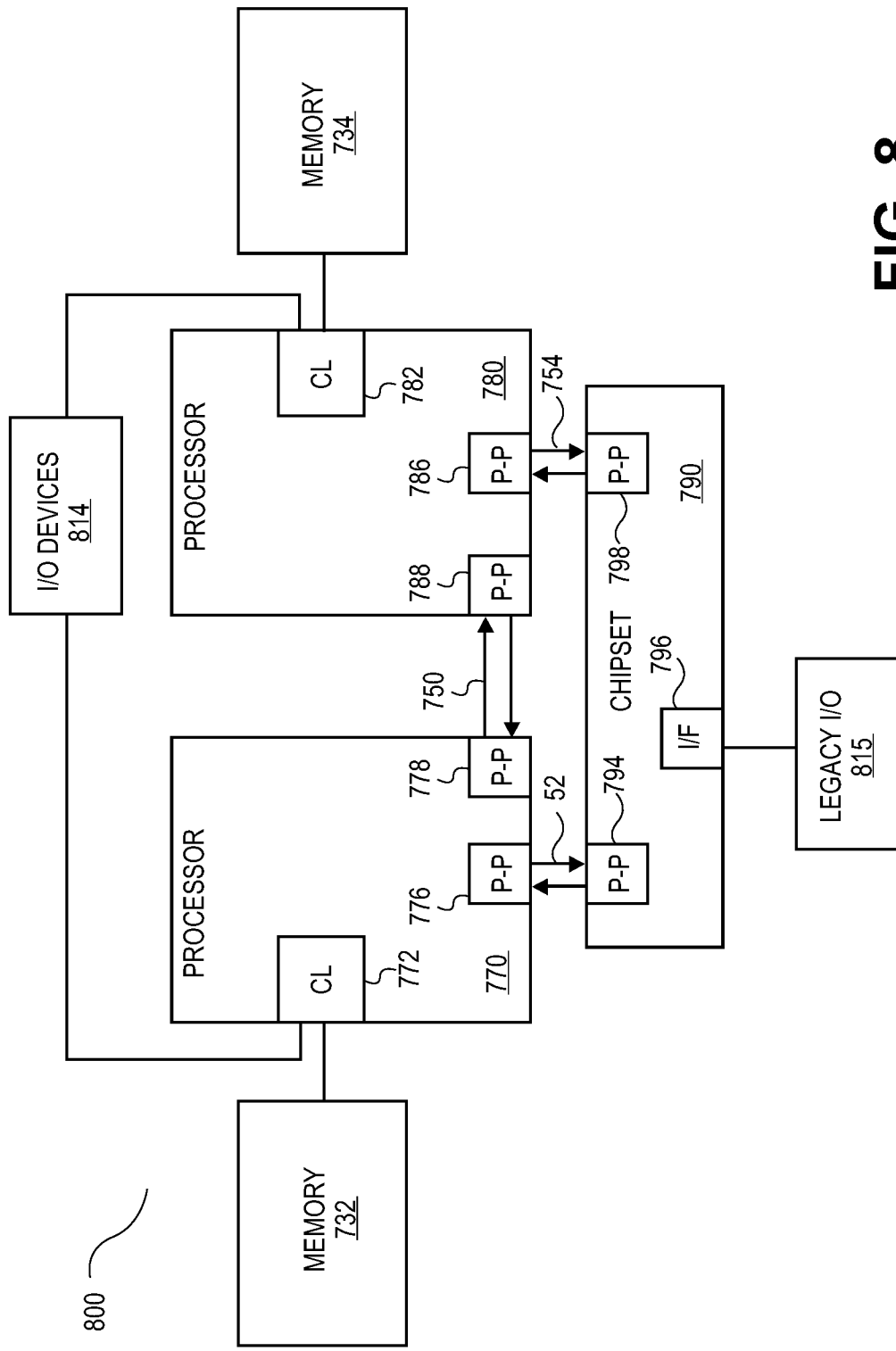
FIG. 8 is a block diagram of a computer system according to one embodiment.
Figure 9:
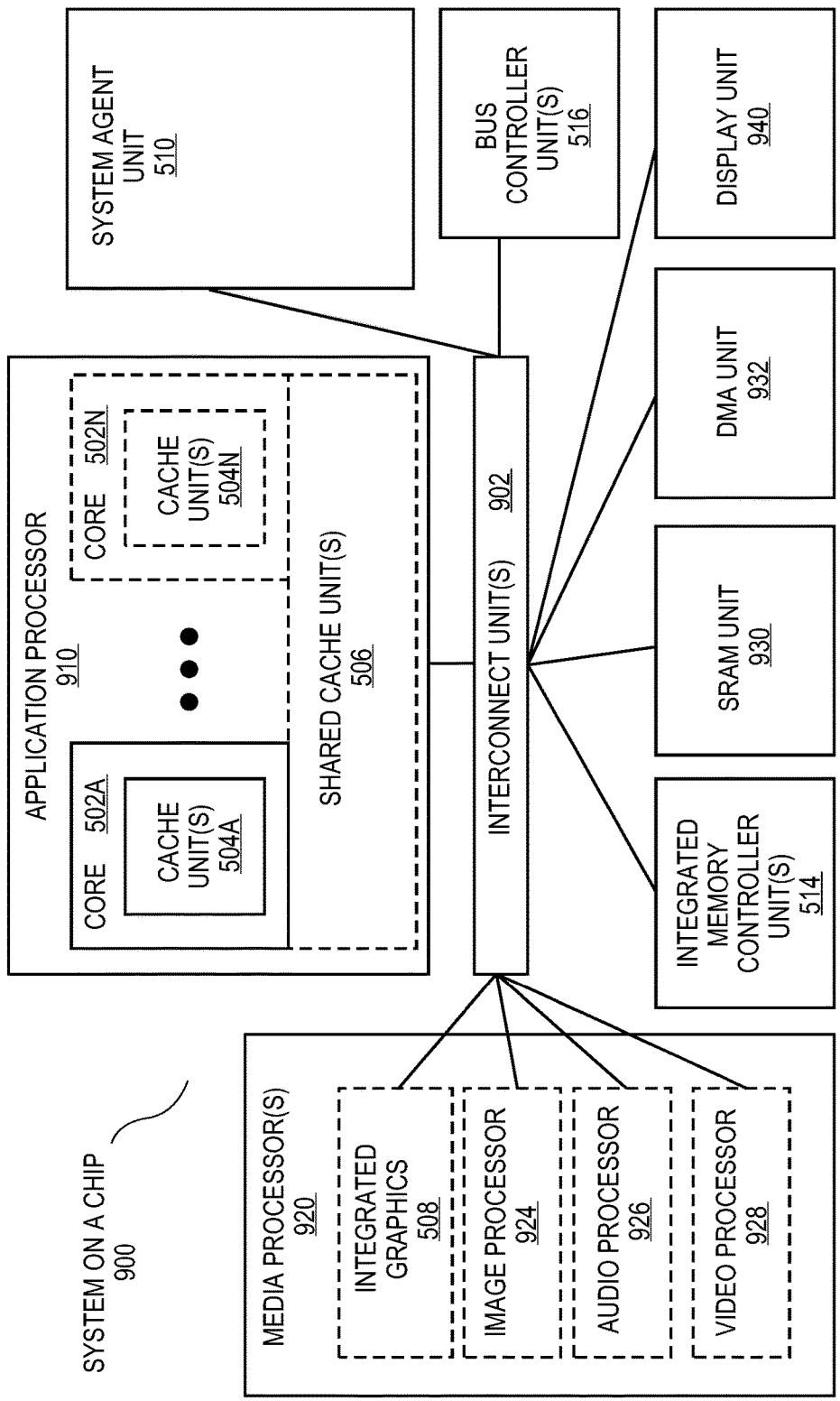
FIG. 9 is a block diagram of a system-on-a-chip according to one embodiment.

FIGS. 6-8 are exemplary systems suitable for including the processor 500, while FIG. 9 is an exemplary system on a chip (SoC) that may include one or more of the cores 502. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 6, shown is a block diagram of a system 600 in accordance with one embodiment of the present invention. The system 600 may include one or more processors 610, 615, which are coupled to graphics memory controller hub (GMCH) 620. The optional nature of additional processors 615 is denoted in FIG. 6 with broken lines.

Each processor 610,615 may be some version of the processor 500. However, it should be noted that it is unlikely that integrated graphics logic and integrated memory control units would exist in the processors 610,615. FIG. 6 illustrates that the GMCH 620 may be coupled to a memory 640 that may be, for example, a dynamic random access memory (DRAM). The DRAM may, for at least one embodiment, be associated with a non-volatile cache.

The GMCH 620 may be a chipset, or a portion of a chipset. The GMCH 620 may communicate with the processor(s) 610, 615 and control interaction between the processor(s) 610, 615 and memory 640. The GMCH 620 may also act as an accelerated bus interface between the processor(s) 610, 615 and other elements of the system 600. For at least one embodiment, the GMCH 620 communicates with the processor(s) 610, 615 via a multi-drop bus, such as a frontside bus (FSB) 695.

Furthermore, GMCH 620 is coupled to a display 645 (such as a flat panel display). GMCH 620 may include an integrated graphics accelerator. GMCH 620 is further coupled to an input/output (I/O) controller hub (ICH) 650, which may be used to couple various peripheral devices to system 600. Shown for example in the embodiment of FIG. 6 is an external graphics device 660, which may be a discrete graphics device coupled to ICH 650, along with another peripheral device 670.

Alternatively, additional or different processors may also be present in the system 600. For example, additional processor(s) 615 may include additional processors(s) that are the same as processor 610, additional processor(s) that are heterogeneous or asymmetric to processor 610, accelerators (such as, e.g., graphics accelerators or digital signal processing (DSP) units), field programmable gate arrays, or any other processor. There can be a variety of differences between the physical resources 610, 615 in terms of a spectrum of metrics of merit including architectural, microarchitectural, thermal, power consumption characteristics, and the like. These differences may effectively manifest themselves as asymmetry and heterogeneity amongst the processors 610, 615. For at least one embodiment, the various processors 610, 615 may reside in the same die package.

Referring now to FIG. 7, shown is a block diagram of a second system 700 in accordance with an embodiment of the present invention. As shown in FIG. 7, multiprocessor system 700 is a point-to-point interconnect system, and includes a first processor 770 and a second processor 780 coupled via a point-to-point interconnect 750. Each of processors 770 and 780 may be some version of the processor 500 as one or more of the processors 610,615.

While shown with only two processors 770, 780, it is to be understood that the scope of the present invention is not so limited. In other embodiments, one or more additional processors may be present in a given processor.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 across a high-performance graphics interface 739 that is coupled with the chipset 790 via an interface 792.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present invention is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Referring now to FIG. 8, shown is a block diagram of a third system 800 in accordance with an embodiment of the present invention Like elements in FIGS. 7 and 8 bear like reference numerals, and certain aspects of FIG. 7 have been omitted from FIG. 8 in order to avoid obscuring other aspects of FIG. 8.

FIG. 8 illustrates that the processors 870, 880 may include integrated memory and I/O control logic ("CL") 872 and 882, respectively. For at least one embodiment, the CL 872, 882 may include integrated memory controller units such as the integrated memory controller unit(s) 514 of FIG. 5 and the IMCs 772 and 782 of FIG. 7. In addition. CL 872, 882 may also include I/O control logic. FIG. 8 illustrates that not only are the memories 732, 734 coupled to the CL 872, 882, but also that one or more I/O device(s) 814 are also coupled to the control logic 872, 882. Legacy I/O devices 815 may be coupled to the chipset 790, for example, if those devices are not or cannot be coupled via the CL 872, 882.

Referring now to FIG. 9, shown is a block diagram of a SoC 900 in accordance with an embodiment of the present invention. Similar elements in FIG. 5 bear like reference numerals. Also, dashed lined boxes are optional features on more advanced SoCs. In FIG. 9, an interconnect unit(s) 902 is coupled to: an application processor 910 which includes a set of one or more cores 502A-N including internal cache unit(s) 504A-N and shared cache unit(s) 506; a system agent unit 510; a bus controller unit(s) 516; an integrated memory controller unit(s) 514; a set or one or more media processors 920 which may include integrated graphics logic 508, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays.

Figure 10:
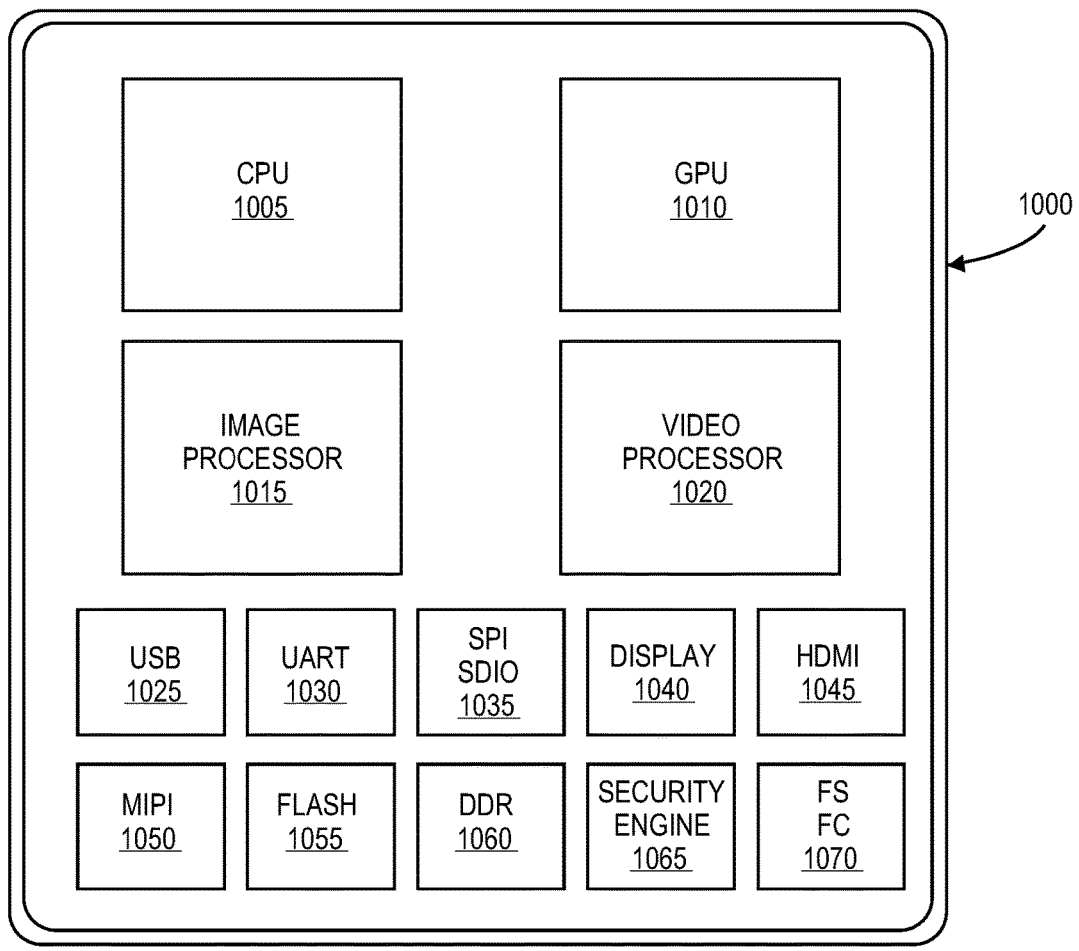
FIG. 10 is a block diagram of a processor according to one embodiment.

FIG. 10 illustrates a processor containing a central processing unit (CPU) and a graphics processing unit (GPU), which may perform at least one instruction according to one embodiment. In one embodiment, an instruction to perform operations according to at least one embodiment could be performed by the CPU. In another embodiment, the instruction could be performed by the GPU. In still another embodiment, the instruction may be performed through a combination of operations performed by the GPU and the CPU. For example, in one embodiment, an instruction in accordance with one embodiment may be received and decoded for execution on the GPU. However, one or more operations within the decoded instruction may be performed by a CPU and the result returned to the GPU for final retirement of the instruction. Conversely, in some embodiments, the CPU may act as the primary processor and the GPU as the co-processor.

In some embodiments, instructions that benefit from highly parallel, throughput processors may be performed by the GPU, while instructions that benefit from the performance of processors that benefit from deeply pipelined architectures may be performed by the CPU. For example, graphics, scientific applications, financial applications and other parallel workloads may benefit from the performance of the GPU and be executed accordingly, whereas more sequential applications, such as operating system kernel or application code may be better suited for the CPU.

In FIG. 10, processor 1000 includes a CPU 1005, GPU 1010, image processor 1015, video processor 1020, USB controller 1025, UART controller 1030, SPI/SDIO controller 1035, display device 1040, HDMI interface 1045, MIPI controller 1050, flash memory controller 1055, dual data rate (DDR) controller 1060, security engine 1065, and $I^2S/I^2C$ controller 1070. Other logic and circuits may be included in the processor of FIG. 10, including more CPUs or GPUs and other peripheral interface controllers.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine readable medium ("tape") and supplied to various customers or manufacturing facilities to load into the fabrication machines 1165 that actually make the logic or processor. For example, IP cores, such as the Cortex™ family of processors developed by ARM Holdings, Ltd. and Loongson IP cores developed the Institute of Computing Technology (ICT) of the Chinese Academy of Sciences may be licensed or sold to various customers or licensees, such as Texas Instruments, Qualcomm, Apple, or Samsung and implemented in processors produced by these customers or licensees.

Figure 11:
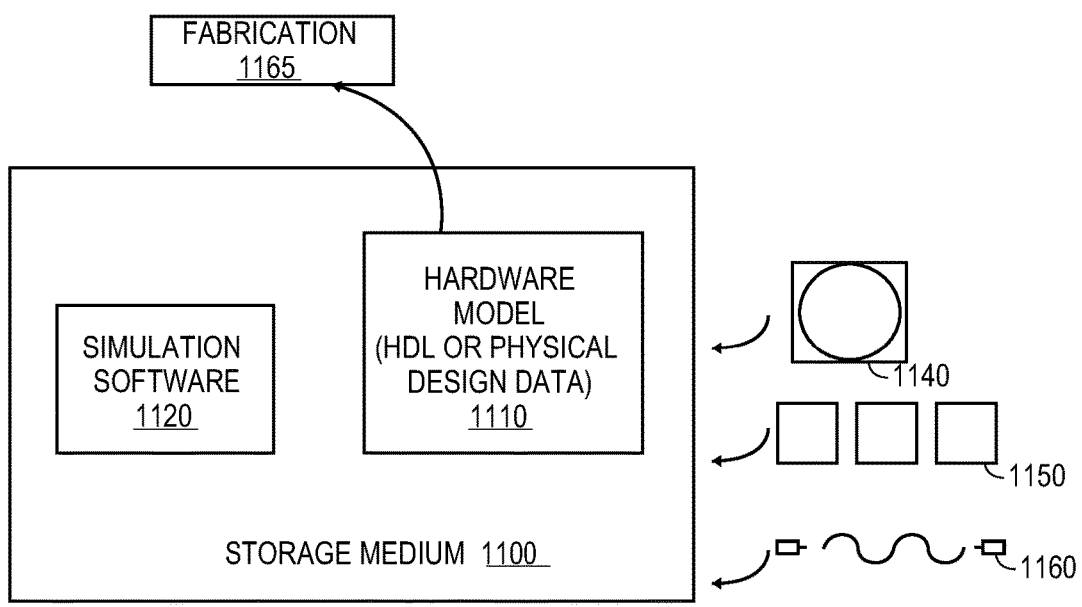
FIG. 11 is a block diagram of an IP core development system according to one embodiment.

FIG. 11 shows a block diagram illustrating the development of IP cores according to one embodiment. A Storage medium 1100 includes simulation software 1120 and/or hardware or software model 1110. In one embodiment, the data representing the IP core design can be provided to the storage medium 1100 via memory 1140 (e.g., hard disk), wired connection (e.g., internet) 1150 or wireless connection 1160. The IP core information generated by the simulation tool and model can then be transmitted to a fabrication facility where it can be fabricated by a 3$^{rd}$ party to perform at least one instruction in accordance with at least one embodiment.

In some embodiments, one or more instructions may correspond to a first type or architecture (e.g., x86) and be translated or emulated on a processor of a different type or architecture (e.g., ARM). An instruction, according to one embodiment, may therefore be performed on any processor or processor type, including ARM, x86, MIPS, a GPU, or other processor type or architecture.

Figure 12:
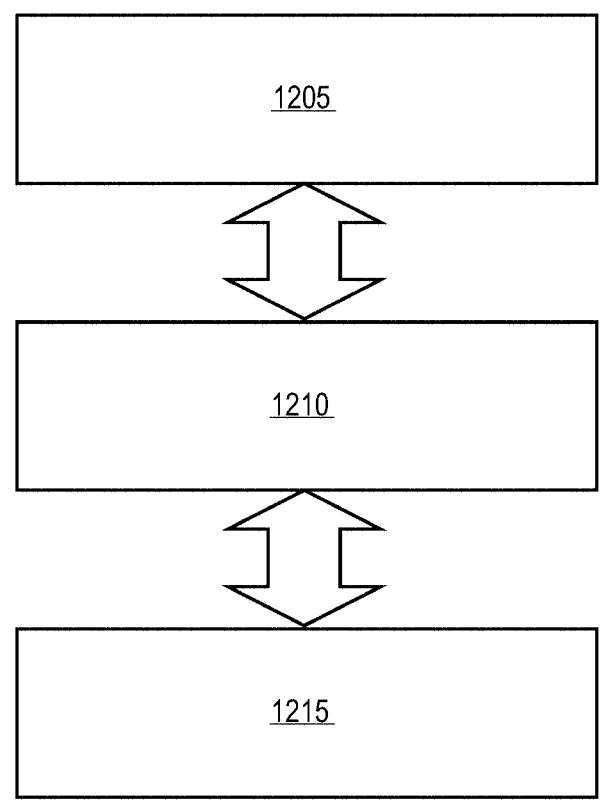
FIG. 12 illustrates an architecture emulation system according to one embodiment.

FIG. 12 illustrates how an instruction of a first type is emulated by a processor of a different type, according to one embodiment. In FIG. 12, program 1205 contains some instructions that may perform the same or substantially the same function as an instruction according to one embodiment. However the instructions of program 1205 may be of a type and/or format that is different or incompatible with processor 1215, meaning the instructions of the type in program 1205 may not be able to executed natively by the processor 1215. However, with the help of emulation logic, 1210, the instructions of program 1205 are translated into instructions that are natively capable of being executed by the processor 1215. In one embodiment, the emulation logic is embodied in hardware. In another embodiment, the emulation logic is embodied in a tangible, machine-readable medium containing software to translate instructions of the type in the program 1205 into the type natively executable by the processor 1215. In other embodiments, emulation logic is a combination of fixed-function or programmable hardware and a program stored on a tangible, machine-readable medium. In one embodiment, the processor contains the emulation logic, whereas in other embodiments, the emulation logic exists outside of the processor and is provided by a third party. In one embodiment, the processor is capable of loading the emulation logic embodied in a tangible, machine-readable medium containing software by executing microcode or firmware contained in or associated with the processor.

Figure 13:
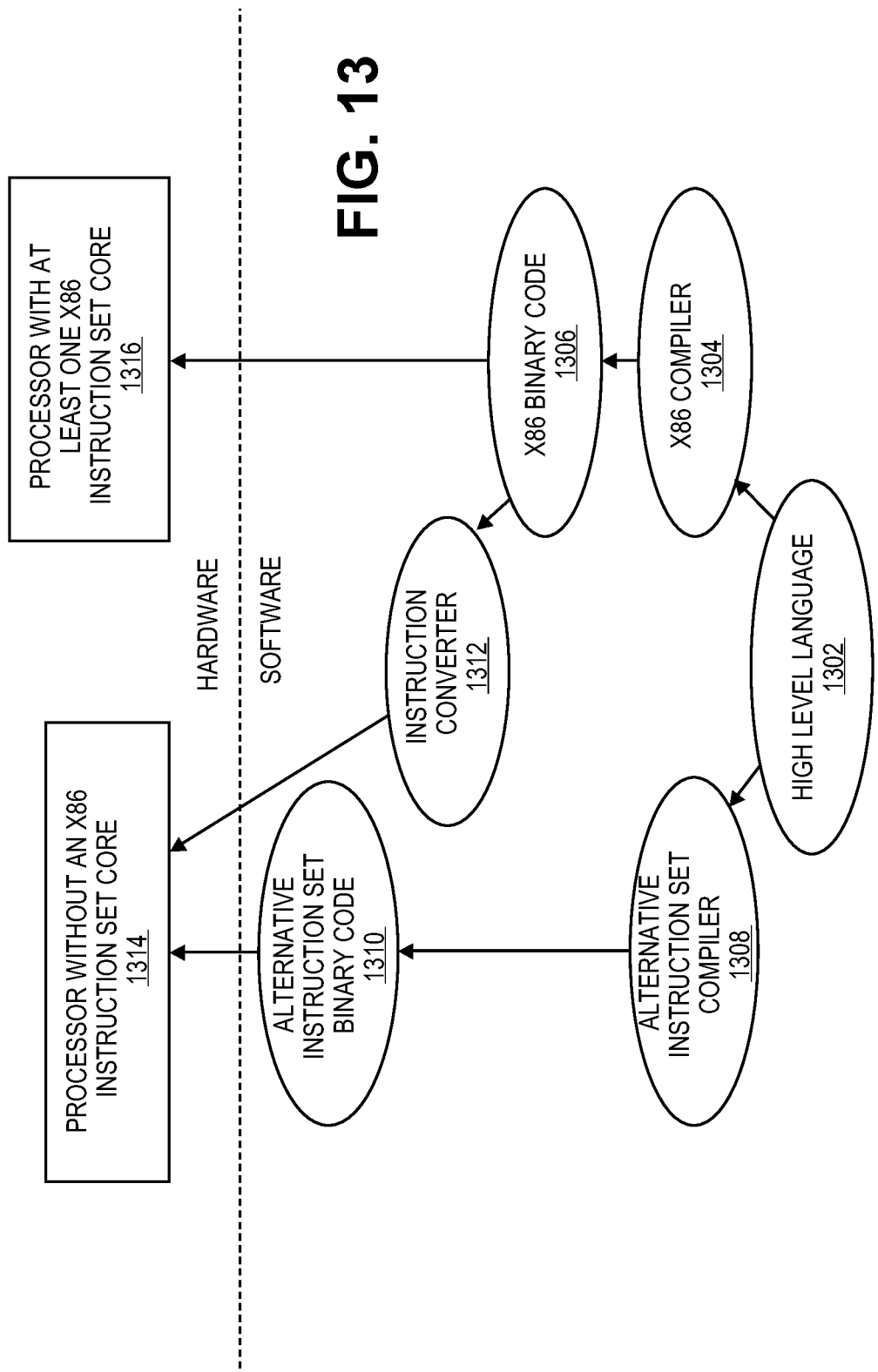
FIG. 13 illustrates a system to translate instructions according to one embodiment.

FIG. 13 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that can perform substantially the same functions as a Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1304 represents a compiler that is operable to generate x86 binary code 1306 (e.g., object code) that can, with or without additional linkage processing, be executed on the processor with at least one x86 instruction set core 1316. Similarly, FIG. 13 shows the program in the high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1312 is used to convert the x86 binary code 1306 into code that may be natively executed by the processor without an x86 instruction set core 1314. This converted code is not likely to be the same as the alternative instruction set binary code 1310 because an instruction converter capable of this is difficult to make; however, the converted code will accomplish the general operation and be made up of instructions from the alternative instruction set. Thus, the instruction converter 1312 represents software, firmware, hardware, or a combination thereof that, through emulation, simulation or any other process, allows a processor or other electronic device that does not have an x86 instruction set processor or core to execute the x86 binary code 1306.

Embodiments of the present invention involve urgency based reordering for priority order servicing of memory requests. A novel memory request reordering algorithm includes several salient features. A reordering algorithm introduces a new metric called request urgency to pick a winning request to be sent out of an interposer (e.g., memory aggregator). Request urgency is defined as a function of the request priority and deadline. The reordering algorithm introduces the concept of urgency promotion, which builds anti-starvation in the algorithm design. This inherent anti-starvation built in this novel algorithm significantly reduces the design complexity and validation effort. For a request queue size of n, the disclosed design has a gate depth of log(n) and area proportional to n, making it very scalable and area-efficient.

The reordering algorithm can be used in request queues in a memory aggregator and more generically in various request queues (e.g., core, caching agent queues, system agent, memory controller, etc.) in the system that require priority-order servicing of requests.

Traditional priority-aware reordering algorithms use the priority or deadline alone to pick a winner amongst the available ready requests. Request availability is determined on various constraints such as availability of credits with the memory controller, no dependency with pending requests etc. However, with traditional priority reordering algorithms, a request dependent on a low-priority request can stay blocked till the low-priority request is serviced. This can result in a high-priority request staying blocked, potentially missing its deadline which might have an adverse effect on system performance. This happens as traditional algorithms do not perform any priority inheritance to allow low-priority requests blocking other high-priority requests to be serviced first. In addition, prior priority aware algorithms implement an anti-starvation algorithm on top of the request arbitration algorithm rather than embedding anti-starvation in the algorithm design itself, making it harder to validate and prove correctness.

In one embodiment, urgency is defined as a function of the priority and deadline of a request. A request with high priority is considered to be more urgent than a request with low priority. Similarly a request with a shorter deadline is considered more urgent than a request with a large deadline value. At the time of admittance to the memory aggregator, each request is assigned an initial urgency value and an urgency delta based on the request's priority class and deadline value. The effective urgency of a request is incremented with the urgency delta each cycle to ensure anti-starvation. The request with the maximum effective urgency is picked as the winner to be sent out of the aggregator each cycle.

Urgency-based reordering in a memory aggregator ensures that the aggregator is priority and deadline aware. Isochronous requests with small deadline values or expired deadlines will get prioritized over other low-priority/large deadline requests. A memory aggregator between two entities A and B will implement credits separately with entity A and with entity B. In the absence of request reordering in the aggregator, the credits that the aggregator has available with B can be under-utilized as described herein. Hence, an aggregator with urgency-based reordering ensures priority and deadline awareness and maximum potential credit utilization compared to an aggregator which does not implement urgency-based reordering.

A memory aggregator can be positioned on a memory interface and can be used to perform additional processing on the memory requests. As one of its planned usage, a memory aggregator can potentially be used to integrate a memory encryption engine (MEE) in a system agent for certain processors.

Figure 14:
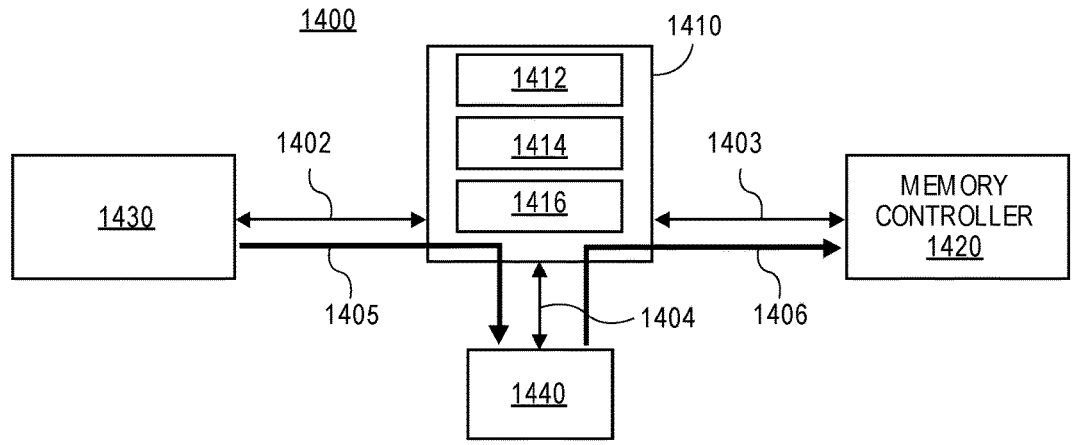
FIG. 14 illustrates a system having a memory aggregator that is integrated with a memory interconnect interface in accordance with one embodiment.

FIG. 14 illustrates a system 1400 having a memory aggregator that is integrated with a memory interconnect interface in accordance with one embodiment. In this usage, the memory aggregator 1410 is positioned on a memory interconnect interface 1402 and 1403 between request units 1430 and 1440. The request unit 1430 (e.g., system agent 1430) receives requests from various request sources including at least one processor core and sends out requests to be serviced by the memory controller 1420. A request unit 1440 also may receive requests from various request sources and may send out requests to be serviced by the memory controller 1420. In one example, certain memory requests falling in a protected memory range are sent to the request unit 1440 (e.g., MEE 1440) via path 1405 using interconnect 1402 and 1404. The request unit 1440 can generate additional memory requests for each request to the protected memory range for integrity and replay-protection. Memory requests can be sent from the request unit 1440 to aggregator 1410 and then to memory controller 1420 via path 1406.

In this example, the memory aggregator has two request sources, the resource units 1430 and 1440. For requests from the resource unit 1430, the aggregator 1410 implements a request priority queue circuit 1412 (e.g., priority queue circuit 1600, apparatus 1600) to buffer these requests until these requests can be sent out to the memory controller 1420 for servicing. Similarly, the aggregator 1410 implements a request priority queue circuit 1414 (e.g., priority queue circuit 1600) for the requests of the resource unit 1430 as well. The aggregator may buffer requests from additional resource units as well. In this example, an arbiter 1416 of the aggregator 1410 arbitrates between these two source units 1430 and 1440 to pick a winner each cycle. The present design can be used or adapted for other usages requiring reordering or requests based on priority and/or deadline. In addition, while the present disclosure discusses embodiments of the invention in context of an aggregator, the reordering algorithm can be used without an aggregator as well. More generically, embodiments of the invention apply to a queue of requests which need to be sent out in priority order. The system 1400 or memory aggregator 1410 can be integrated with any system or processor (e.g., 100, 160, 200, 490, 500, 600, 700, 800, 900, 1000, etc.) of the present disclosure in accordance with the present design.

At a high level, the memory aggregator 1410 uses a request arbiter 1416 to arbitrate between requests from the resource unit 1440 and the requests from the request unit 1430 and pick one of the request sources as the arbitration winner during each arbitration cycle. The requests sent from the resource unit 1430 have an associated priority and deadline. The priority field can be n bit value with n being an integer (e.g., 4-bit value) in which a higher value indicates a higher priority request. The deadline field can also be n bit value (e.g., an 11-bit value) which indicates the absolute time in the future by which the request must be completed.

Figure 15A:
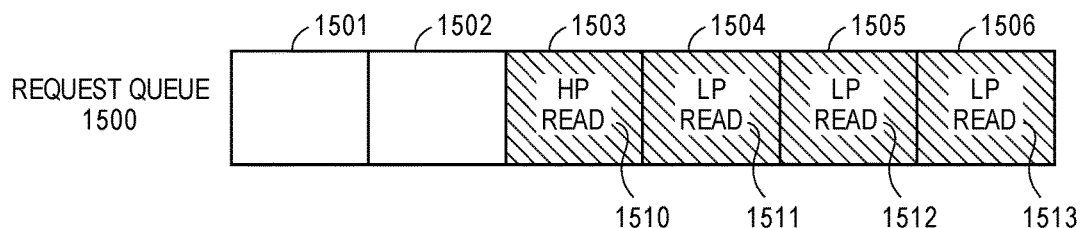
FIGS. 15A and 15B each show a request queue.
Figure 15B:
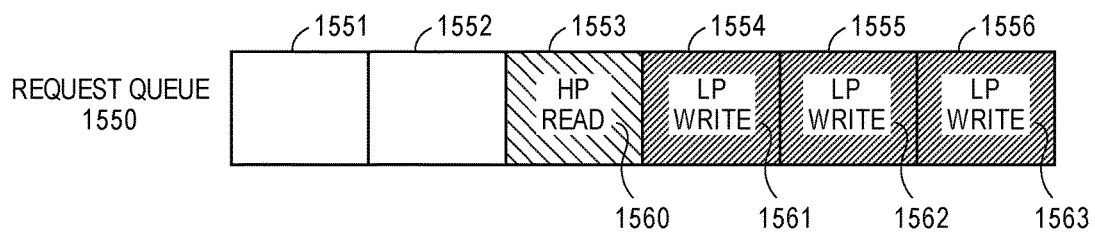

In one example, the resource unit 1430 maintains a counter that maintains the current time and is distributed globally. The deadline value assigned is the value of the timer by which the request must be serviced. The priority and deadline values are comprehended by the memory controller 1420 to make scheduling decisions. Essentially higher priority requests are serviced first and in case of multiple requests in the same priority class, the deadline field is used to break ties. The higher the priority and shorter the deadline, then the more urgent is a request. The request arbiter 1416 in the aggregator 1410 arbitrates between these two request sources and picks one winner each arbitration cycle to send to the memory controller 1420 for servicing. However, there are several factors that must be considered in the design of the request arbiter and these request queues. In regards to priority and deadline awareness, isochronous requests with small deadline values or expired deadlines are prioritized over other requests (e.g., for modem requests, the request unit 1430 sets the deadline to zero indicating that the request must be serviced as soon as possible). For credit utilization, credits available with the memory controller 1420 should not be under-utilized. FIGS. 15A and 15B show possible scenarios for the request queues which motivates the need for a reordering algorithm in the request queues.

FIGS. 15A and 15B each show a request queue having four requests. The request queue 1500 includes positions or slots 1501-1506. The queue 1500 includes three LP (low-priority) read requests 1511-1513 that are ordered ahead of a HP (high-priority) read request 1503 that is positioned at a back of the queue. Requests are removed from a position 1506, a position 1505, a position 1504, and then subsequently from a position 1503 without reordering. With no reordering of requests, the high-priority request 1510 will be pushed out only after the three low priority requests have been sent to the memory controller. In a second scenario, there can be low priority writes 1554-1556 ahead of a high-priority read 1553 within a queue 1550 having positions or slots 1551-1556. As shown in FIG. 15B, the write requests are not ready to be sent to the memory controller (shown as heavy shading in FIG. 15B) due to non-availability of write credits. Light shading in FIGS. 15A and 15B indicates that the read requests due have available read credits. In this case, without reordering in the queues, the high-priority read request 1553 which is ready to be sent to the memory controller for servicing, cannot be sent out because it is being blocked by other low-priority write requests. While FIGS. 15A-15B show some scenarios using priority alone, similar such scenarios can be constructed using request deadlines. Hence, in order to allow high-priority (low deadline) requests to be sent to the memory controller first and to ensure that credits are not under-utilized, the request queues must allow for reordering requests.

A priority request queue is a queue that outputs the most urgent request each cycle among all the available requests in the queue in that cycle. If the request arbiter picks the queue as a winner, the queue output request will be dequeued and sent to the memory controller.

In one embodiment, urgency is defined as a measure of the priority and deadline of a request. A request with high priority is considered to be more urgent than a request with low priority. Similarly a request with a shorter deadline is considered more urgent than a request with a large deadline value. For each request sent over the memory interconnect interface, a request unit assigns the request a priority level that indicates a measure of priority and a deadline. In one example, priority levels used by the request unit (e.g., request unit 1430) are shown in Table 1.

TABLE 1

| Priority levels | |
| --- | --- |
| Access Class | Description |
| P0 | Escalates to high |
| P1 | Deadline traffic |
| P2 | Always critical |
| P3 | Always high priority |
| P4 | Latency Tolerant |

Each request is assigned an initial urgency value (e.g., 8-bit value) and an urgency delta (e.g., 4-bit value) at the time of admission in to the queue based on the request's priority level and deadline value. Every cycle for which the request remains in the queue, a request's urgency value is incremented by the amount specified by its urgency delta. In one example, the following eight urgency levels are defined:

URG0: All requests in P0 map to URG0

URG1: All requests in P1 with deadline less than P1 threshold level 0(THR0) in the future map to URG1. The default value for P1_THR0 is set to 0 which translates to requests with expired deadline mapping to URG1.

URG2: All requests in P1 with deadline less than P1_threshold level 1(THR1) in the future map to URG2. The default value for P1_THR1 is set to a small number to map requests with impending deadline to URG2.

URG3: All P1 requests not mapping to URG1 or URG2 are mapped to URG3. Essentially, requests with non-impending deadline map to this class URG4: All P2 requests map to URG4.

URG5: All P3 requests map to URG5.

URG6: All P4 requests map to URG6.

URG7: Reserved.

In one example, Table 2 shows examples of default urgency and urgency delta assignment for the different request categories. In another example, other types of classes, values, and classifications can be used instead of Tables 1 and 2.

TABLE 2

| Urgency and Urgency Delta Assignment | | | | |
| --- | --- | --- | --- | --- |
| Request Category | Urgency | Urgency Delta | Classification Condition | Cycles to Max. Urgency |
| URG0 | 8'b00000000 | 4'b0010 | P0 Requests (e.g., CPU Requests) | 128 |
| URG1 | 8'b10000000 | 4'b0100 | P1 Requests (deadline—current_timer) < P1_THR0 | 32 |
| URG2 | 8'b01000000 | 4'b0100 | P1 Requests (deadline—current_timer) < P1_THR1 | 48 |
| URG3 | 8'b00000000 | 4'b0100 | P1 Requests not in URG1 and URG2 | 64 |
| URG4 | 8'b10000000 | 4'b1000 | P2 Requests (Always Critical) | 16 |
| URG5 | 8'b10000000 | 4'b0100 | P3 Requests (Always high priority) | 32 |
| URG6 | 8'b00000000 | 4'b0001 | P4 Requests (latency tolerant) | 256 |
| URG7 | — | — | — | — |

The urgency of a request is incremented each cycle it is resident in the queue by the urgency delta value of that request. Hence, an urgency delta value is used for urgency promotion of requests to ensure protection against starvation. A higher urgency delta value results in a request becoming the most urgent (i.e., maximum urgency) at a faster rate than with a lower urgency delta value. In this example, URG4 has a highest urgency delta value to indicate a shortest number of cycles to maximum urgency. Thus, URG4 is the most urgent request in Table 2.

Table 3 shows the number of cycles it takes for the different categories of requests to achieve maximum urgency, at which point the requests are prioritized over all the other requests present in the queue.

Table 3 shows the default values for P1_THR0 and P1_THR1 used to classify P1 requests as URG1, URG2, or URG3.

In one example,

TABLE 3

| P1 Threshold Values | |
| --- | --- |
| Parameter | Default Value |
| P1_THR0 | 10'b0000000000 |
| P1_THR1 | 10'b0000010000 |

In one example, P1_THR0 is set to zero by default to classify requests with expired deadlines as URG1 requests. In this example, P1_THR1 can be set to 16 by default. With urgency promotion, the urgency of URG2 requests will escalate to the initial urgency of URG1 requests after P1_THR1 cycles.

A priority queue is defined as a queue that outputs the most urgent request each cycle among all the available requests in the queue in that cycle. An available request is defined as a request that is contending to be picked as the output of the priority queue. For a request to be contending, the no dependency and credit availability constraints need to be met. Dependency for a request is determined at the time of admittance by comparing the address of the request with the addresses of other requests present in the queue. An address match with an already present request indicates a dependency and the incoming request is marked as "not ready." Dependency clears when a first request on which a second request is dependent on is sent out of the queue to the memory controller.

If the request is not dependent on any other request, then in order to be contending, there need to be credits for that request type (e.g., read or write) available with the memory controller.

As discussed above, dependency for the request is determined at the time of its admittance. In addition to marking the incoming request as dependent (e.g., a not ready status), a priority queue also performs urgency inheritance. If the urgency of the request on which the incoming request is dependent on is less than the urgency of the incoming request, then the older request inherits the urgency of the incoming request. Similar inheritance is done for the urgency delta value as well. Urgency inheritance ensures that if a higher-urgency request is dependent on a lower-urgency request, the dependency clears earlier than in the absence of inheritance.

Figure 16:
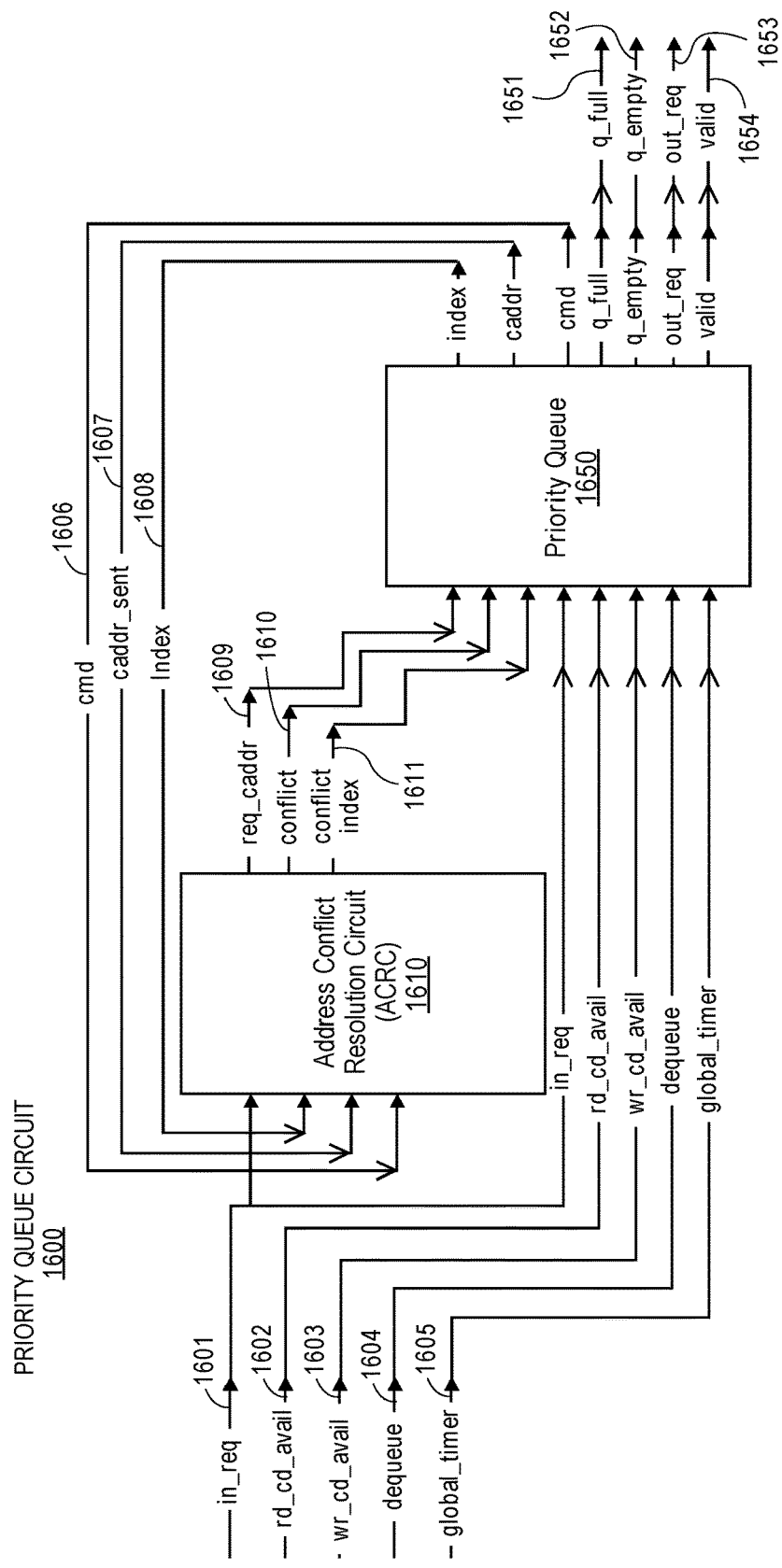
FIG. 16 illustrates an architecture of a priority queue circuit of a memory aggregator in accordance with one embodiment.

FIG. 16 illustrates an architecture of a priority queue circuit of a memory aggregator in accordance with one embodiment. A priority queue circuit 1600 (e.g., apparatus 1600) of a memory aggregator (e.g., memory aggregator 1410) includes two functional units, the address conflict resolution circuit 1610 and a priority queue 1650. An address conflict resolution circuit 1610 (ACRC) keeps track of all valid requests (e.g., requests 1601) in the priority queue and is used to detect dependency (i.e., address conflicts) for an incoming request at the time of admission. The priority queue 1650 receives input signals including incoming requests 1601, read credit availability 1602, write credit availability 1603, dequeuer 1604, and global timer 1605 from a request unit. The priority queue 1650 receives input signals including request compressed address 1609, conflict 1610, and conflict index 1611 from the ACRC 1610. The priority queue 1650 generates output signals including command 1606, compressed address sent 1607, and index 1608 to be sent to the ACRC 1610. The priority queue 1650 also generates output signals including queue full 1651, queue empty 1652, output request 1653, and valid 1654 to be sent to a next stage (e.g., arbiter of memory aggregator, memory controller, etc.).

Figure 17:
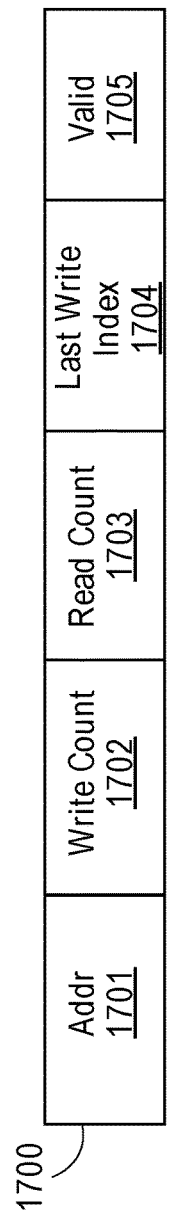
FIG. 17 illustrates fields in a table in accordance with one embodiment.

The ACRC internally maintains a table for its functionality. FIG. 17 illustrates fields for entries in a table in accordance with one embodiment. A table 1700 includes an Addr field 1701 having a full address of a request, a write count field 1702 having a number of writes in the priority queue to this address (Addr), a read count field 1703 having a number of reads in the priority queue to this address (Addr), a last write index field 1704 that includes an index of the last write request to this address (Addr) in the priority queue, and a valid field 1705 to indicate whether an ACRC table entry is valid or not.

The ACRC implements two flows as part of its functionality including new request admittance flow and ACRC table update flow. The ACRC takes the incoming request and its index for an entry in the priority queue as the input and outputs if there is a conflict of the incoming request with a request present in the priority queue. The output includes the index of the priority queue entry with which the conflict exists and the index in the ACRC table where information about this request address is stored. This index in the ACRC table is also referred to as the compressed address 1607 (e.g., width log 2(number of entries in queue)). The ACRC implements functionality for a new request admittance. On receiving a new request, the ACRC table is looked up to determine if an entry with the same address as the incoming request exists. If an entry with the same address exists with write count>0, a conflict condition is detected with a request that is present in the priority queue. The last write index field 1704 in the ACRC table entry indicates the conflicting entry index in the priority queue for the incoming request. Then, the ACRC updates the read/write count and the last write index field based on the incoming request type. If an entry with the same address is not found, then the new address is inserted at the first available entry in the ACRC table. Subsequently, the read/write count updates appropriately and sets the last write index to the index of the incoming request in the priority queue.

For an ACRC update flow, when a request is dequeued from the priority queue, the priority queue sends the compressed address 1607 and the command 1606 of the request dequeued to the ACRC. This information is used by ACRC to update the information in the ACRC table related to request address. ACRC implements update functionality including the incoming compressed address being provided to the index in the ACRC table to update and updating the read and write count appropriately based on the command being sent out. If as a result of this update, both read and write counts in the ACRC table entry become zero, then the ACRC entry is marked invalid indicating that all the outstanding requests to that address have been sent out of the priority queue.

A priority queue presents a most urgent request from the requests available in the queue to a request arbiter (e.g., request arbiter of the memory aggregator) and uses the ACRC internally for implementing its functionality.

Figure 18:
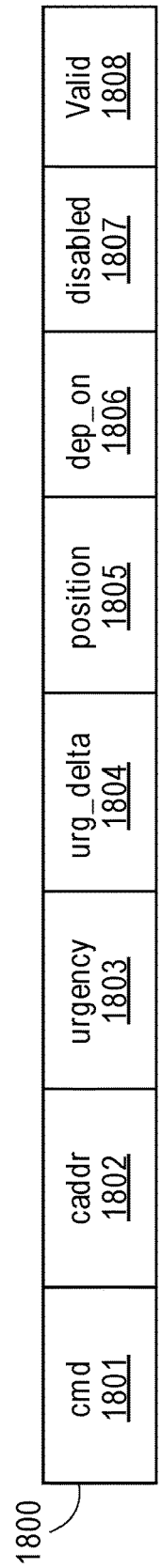
FIG. 18 illustrates fields in a table for each entry in a priority queue in accordance with one embodiment.

FIG. 18 illustrates fields in a table for each entry in a priority queue in accordance with one embodiment. A table 1800 includes a request command field 1801 (e.g., Rd:0, Wr:1), a compressed address field 1802, an urgency field 1803 to indicate urgency information (e.g., urgency value) that is associated with a request, an urgency delta field 1804 to indicate urgency delta information (e.g., urgency delta value) used for urgency promotion, a position field 1805 that represents a logical order of a request within the priority queue, a dependency field 1806 to indicate an index of the entry in the priority queue on which an entry of a requests depends upon, a disabled field 1807, and a valid field 1808. A logical order is defined as the order in which the requests arrive in the priority queue. The disabled field 1807 indicates if the request is currently dependent on another request or not (e.g., dependent: 1, not-dependent: 0). The valid field 1808 includes whether a queue entry is valid. The priority queue implements three flows as part of its functionality: new request admittance, winner selection, and priority queue update.

In regards to new request admittance, the priority queue implements the following functionality when a new request is admitted to the queue. The incoming request is assigned an initial urgency and urgency delta based on the request category as defined herein. The position field for the incoming request is set to the number of entries in the queue, effectively making the new request as the last request in the logical order. The priority queue receives conflict information for the incoming request from the ACRC. In particular, the conflict information includes whether the incoming request is dependent on any request already present in the queue and the queue index of the request on which the incoming request depends upon. If the incoming request has a conflict, its disabled bit is set and its dependency field is set to the index of the request on which it is dependent on. If required, urgency promotion is performed for all requests in the priority queue with the same address as the incoming request. The incoming request is inserted at the first available position in the priority queue. Hence, there might not be any correlation between the index at which a request is inserted in the queue and its logical order.

In regards to winner selection, the priority queue has an output, out_req 1653, which is the request that is the most urgent request in the queue for that cycle. This request is called the winning request of the priority queue for that cycle. The priority queue implements the following functionality for implementing the winner selection logic. The priority queue computes all the requests contending in that cycle to be the winner. A request is considered to be contending if it is valid, not disabled and has the required credits available (e.g., Read/Write based on the request type) with the memory controller. The winning request is picked from the array of contending requests as the request with a most urgent value or maximum urgency value in relation to other requests in the priority queue. In case of ties with 2 requests having the same urgency (or approximately the same urgency), the logical order (position) of the requests is used to break ties with the request lower in the logical order given preference. For example, requests having a same level of urgency can be processed with a first in first out order.

In regards to a priority queue update, a priority queue implements update operations including priority queue entries being updated every cycle to update their urgency value. The urgency delta value is added to the current urgency each cycle to get a new urgency value for the request. In addition, if the queue is picked as the winner by the request arbiter, the winning request is dequeued from the priority queue. Upon dequeuing a request, the logical order of requests needs to be updated. The logical order of all requests higher in the logical order than the winning request is decremented by 1 when the winning request is dequeued. On a dequeue operation, the index of the winning request is broadcasted to all the entries in the priority queue. If a request is dependent on the request being dequeued, the disabled bit for that request is cleared making it eligible to contend in the winner selection logic in the next cycle.

For a request arbitration algorithm, the queues for request units 1430 and 1440 are implemented as priority queues, while a request arbiter of the memory aggregator 1410 is implemented as an urgency-aware weighted fair arbiter. Both queues output a winning request during each cycle and this is the most urgent request with the maximum urgency in each queue. The request arbiter receives the winning requests from the two queues as input and compares the urgency of these two requests and picks the request with the higher urgency as the winner of the arbitration cycle. If both the requests have the same urgency, then the arbiter falls back to weighted round-robin arbitration in one example. The request arbiter asserts the dequeue signal for the queue from which the winner of the arbitration cycle was picked and forwards the winning request to the memory controller.

Embodiments of the present invention can be used in any queue that requires its elements to be sent out in a priority order. With a number of queues present in a system agent, the present design can be used in different units in the system agent. As potential examples, request unit(s) and a memory controller in a system agent can use the priority based reordering proposed. In addition, the present design can also be used in memory aggregators which are used to aggregate and arbitrate between memory requests from various request sources and integrate additional logic with minimal impact to the existing design. In one example, a memory aggregator can be integrated with MEE (used for Secure Enclaves) in the system agent. Hence, in one of its implementation, the present design is also used to improve the security of computing products.

Figure 19:
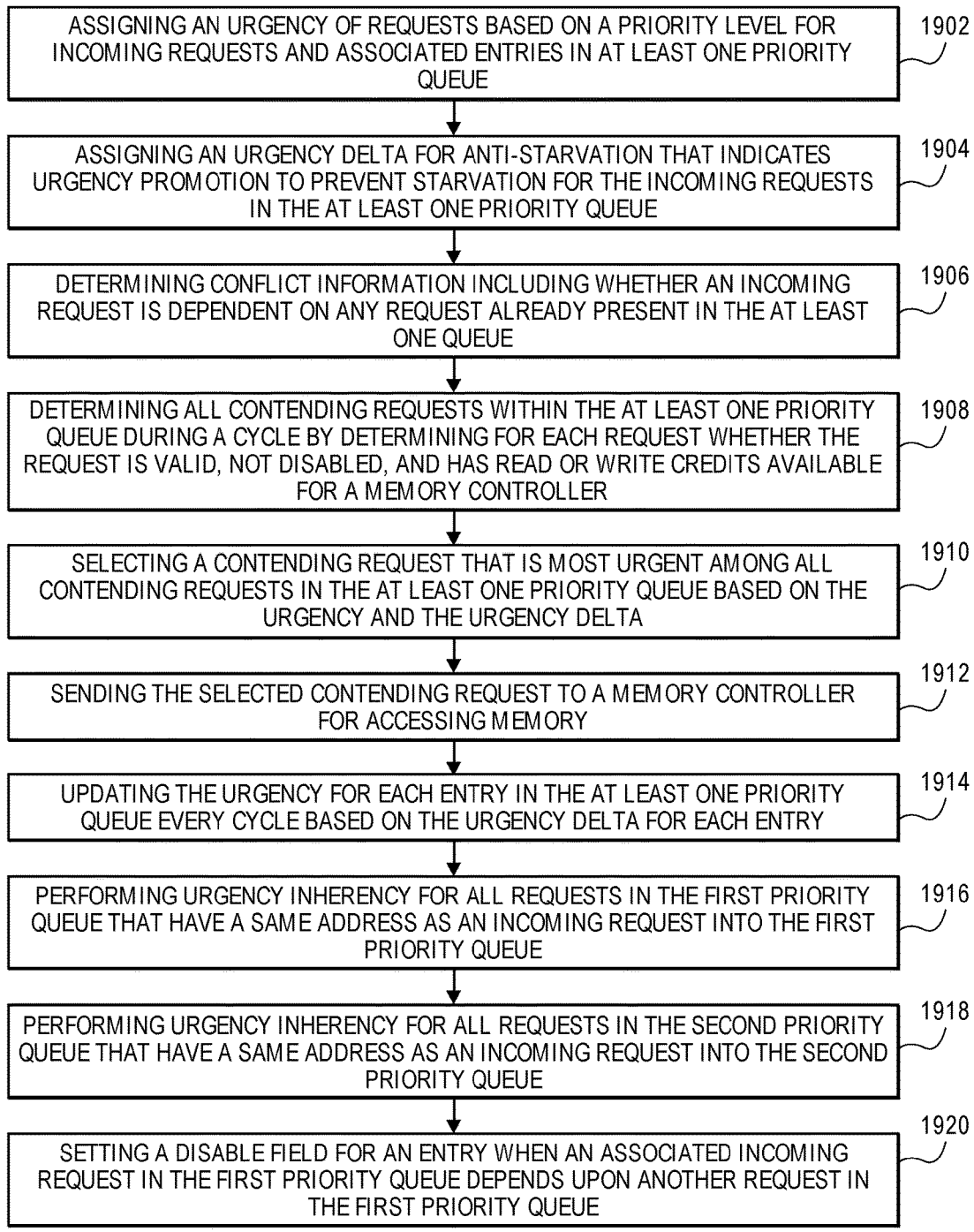
FIG. 19 illustrates a method for urgency based reordering for priority order servicing of memory requests in accordance with one embodiment.

FIG. 19 illustrates a method for urgency based reordering for priority order servicing of memory requests in accordance with one embodiment. Operations of the method 1900 may be implemented in hardware, software, firmware, or a combination of such implementation approaches. These operations may be implemented as computer programs or program code executing on programmable systems comprising at least one processor, a storage system (including volatile and non-volatile memory and/or storage elements), at least one input device, and at least one output device.

At operation 1902, the method 1900 includes assigning an urgency of requests based on a priority level for incoming requests and associated entries in at least one priority queue. At operation 1904, the method includes assigning an urgency delta for anti-starvation that indicates urgency promotion to prevent starvation for the incoming requests in the at least one priority queue. At operation 1906, the method includes determining conflict information including whether an incoming request is dependent on any request already present in the at least one queue. Determining of the conflict information including whether an incoming request is dependent on any request already present in the at least one queue comprises determining conflict information for each request and associated entry in the first and second priority queues by determining whether each incoming request for the first priority queue is dependent on any request that is already present in the first queue and by determining whether each incoming request for the second priority queue is dependent on any request that is already present in the second queue. At operation 1908, the method includes determining all contending requests within the at least one priority queue during a cycle by determining for each request whether the request is valid, not disabled, and has read or write credits available for a memory controller. At operation 1910, the method includes selecting a contending request that is most urgent among all contending requests in the at least one priority queue based on the urgency and the urgency delta. At operation 1912, the method includes sending the selected contending request to a memory controller for accessing memory.

At operation 1914, the method includes updating the urgency for each entry in the at least one priority queue every cycle based on the urgency delta for each entry. In one example, the at least one priority queue includes first and second priority queues. At operation 1916, the method includes performing urgency inherency for all requests in the first priority queue that have a same address as an incoming request into the first priority queue. At operation 1918, the method includes performing urgency inherency for all requests in the second priority queue that have a same address as an incoming request into the second priority queue. At operation 1920, the method includes setting a disable field for an entry when an associated incoming request in the first priority queue depends upon another request in the first priority queue.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Embodiments of the present invention may be implemented as any one or a combination of: one or more microchips or integrated circuits interconnected using a parent-board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Thus, techniques for performing one or more instructions according to at least one embodiment are disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

The following examples pertain to further embodiments. Example 1 is a machine-readable medium having stored thereon instructions, which if performed by a machine causes the machine to perform a method comprising assigning an urgency based on a priority level for incoming requests and associated entries in at least one priority queue, assigning an urgency delta for urgency promotion to prevent starvation for the incoming requests in the at least one priority queue, determining conflict information including whether an incoming request is dependent on any request already present in the at least one queue, and determining all contending requests within the at least one priority queue during a cycle.

In example 2, the subject matter of example 1 can optionally include selecting a contending request that is most urgent among all contending requests in the at least one priority queue and sending the selected contending request to a memory controller for accessing memory.

In example 3, the subject matter of any of examples 1-2 can optionally include updating the urgency for each entry in the at least priority queue every cycle based on the urgency delta for each entry.

In example 4, the subject matter of any of examples 1-3 can optionally include the at least one priority queue including first and second priority queues.

In example 5, the subject matter of any of examples 1-4 can optionally include determining conflict information including whether an incoming request is dependent on any request already present in the at least one queue comprises determining conflict information for each request and associated entry in the first and second priority queues by determining whether each incoming request for the first priority queue is dependent on any request that is already present in the first queue and by determining whether each incoming request for the second priority queue is dependent on any request that is already present in the second queue.

In example 6, the subject matter of any of examples 1-5 can optionally include performing urgency inherency for all requests in the first priority queue that have a same address as an incoming request into the first priority queue and performing urgency inherency for all requests in the second priority queue that have a same address as an incoming request into the second priority queue.

In example 7, the subject matter of any of examples 1-6 can optionally include setting a disable field for an entry when an associated incoming request in the first priority queue depends upon another request in the priority queue.

In example 8, the subject matter of any of examples 1-7 can optionally include determining all contending requests within the at least one priority queue during a cycle comprises determining for each request whether the request is valid, not disabled, and has read or write credits available for a memory controller.

Example 9 is an apparatus (e.g., priority queue circuit) comprising an address conflict resolution circuit (ACRC) coupled to the priority queue. The ACRC to determine conflict information including whether an incoming request is dependent on any request already present in the priority queue and a priority queue coupled to the ACRC. The priority queue to assign an urgency based on a priority level for incoming requests and associated entries in the priority queue, to assign an urgency delta for urgency promotion to prevent starvation for the incoming requests and to determine all contending requests within the priority queue during a cycle.

In example 10, the subject matter of example 9 can optionally include the priority queue to select a contending request that is most urgent among all contending requests in the priority queue and to send the selected contending request to an arbiter.

In example 11, the subject matter of any of examples 9-10 can optionally include the priority queue being further configured to update the urgency for each entry in the priority queue every cycle based on the urgency delta for each entry.

In example 12, the subject matter of any of examples 9-11 can optionally include the ACRC being configured to determine conflict information including whether an incoming request is dependent on any request already present in the priority queue based on determining whether an entry in a table of the ACRC has an address that matches an address of an incoming request.

In example 13, the subject matter of any of examples 9-12 can optionally include each entry of the table of the ACRC including an address field indicating an address of a request, a write count field indicating a number of writes in the priority queue to the address of the request, a read count field indicating a number of reads in the priority queue to the address of the request, a last write index indicating an index of a last write request to the address of the request in the priority queue, and a valid field indicating whether the entry is valid.

In example 14, the subject matter of any of examples 9-13 can optionally include the priority queue being further configured to perform urgency inherency for all requests in the priority queue that have a same address as an incoming request into the priority queue.

In example 15, the subject matter of any of examples 9-14 can optionally include the priority queue being further configured to set a disable field for an entry when an associated incoming request in the priority queue depends upon another request in the priority queue.

In example 16, the subject matter of any of examples 9-15 can optionally include the priority queue being configured to determine all contending requests within the at least one priority queue during a cycle based on determining for each request whether the request is valid, not disabled, and has read or write credits available for a memory controller.

Example 17 is a system comprising a first priority queue circuit to determine conflict information including whether an incoming request is dependent on any request already present in the first priority queue circuit, to assign an urgency based on a priority level for incoming requests and associated entries in the first priority queue circuit, to assign an urgency delta for urgency promotion to prevent starvation for the incoming requests, and to determine all contending requests within the first priority queue circuit during a cycle. The system also includes a second priority queue circuit to determine all contending requests within the second priority queue circuit during the cycle and an arbiter to receive a first request from the first priority queue circuit and to receive a second request from the second priority queue circuit.

In example 18, the subject matter of example 17 can optionally include the arbiter being further configured to compare a first urgency level of the first request with a second urgency level of the second request for the cycle, select the first request when the first urgency level is greater than the second urgency level and select the second request when the second urgency level is greater than the first urgency level, and send the selected request to a memory controller.

In example 19, the subject matter of any of examples 17-18 can optionally include the arbiter being further configured to select one of the first and second requests based on weighted round-robin arbitration when the second urgency level is equal the first urgency level.

In example 20, the subject matter of any of examples 17-19 can optionally include the first priority queue circuit being further configured to select a contending request that is most urgent among all contending requests in the first priority queue circuit and to send the selected contending request to the arbiter.

In example 21, the subject matter of any of examples 17-20 can optionally include the first priority queue circuit being further configured to update the urgency for each entry in the first priority queue circuit every cycle based on the urgency delta for each entry.

In example 22, the subject matter of any of examples 17-21 can optionally include the first priority queue circuit being further configured to perform urgency inherency for all requests in the first priority queue circuit that have a same address as an incoming request into the first priority queue circuit.

Example 23 is a processor comprising at least one processor core to execute instructions to process data and a system agent unit is coupled to the at least processor core. The system agent unit receives requests from the at least one processor core and a memory aggregator is coupled to the system agent unit. The memory aggregator includes a first priority queue circuit and a second priority queue circuit. The first priority queue circuit to determine conflict information including whether an incoming request from the system agent unit is dependent on any request already present in the first priority queue circuit, to assign an urgency based on a priority level for incoming requests and associated entries in the first priority queue circuit, to assign an urgency delta for urgency promotion to prevent starvation for the incoming requests, and to determine all contending requests within the first priority queue circuit during a cycle.

In example 24, the subject matter of example 23 can optionally include the second priority queue circuit being configured to receive requests from a request unit and to determine all contending requests within the second priority queue circuit during the cycle.

In example 25, the subject matter of any of examples 23-24 can optionally include the memory aggregator further comprising an arbiter to receive a first request from the first priority queue circuit and to receive a second request from the second priority queue circuit.

In example 26, the subject matter of any of examples 23-25 can optionally include the arbiter being further configured to compare a first urgency level of the first request with a second urgency level of the second request for the cycle, select the first request when the first urgency level is greater than the second urgency level and select the second request when the second urgency level is greater than the first urgency level, and send the selected request to a memory controller.

In example 27, the subject matter of any of examples 23-26 can optionally include the first priority queue circuit being further configured to select a contending request that is most urgent among all contending requests in the first priority queue circuit and to send the selected contending request to the arbiter.

In example 28, the subject matter of any of examples 23-27 can optionally include the first priority queue circuit being further configured to update the urgency for each entry in the first priority queue circuit every cycle based on the urgency delta for each entry.

In example 29, the subject matter of any of examples 23-28 can optionally include the first priority queue circuit being further configured to perform urgency inherency for all requests in the first priority queue circuit that have a same address as an incoming request into the first priority queue circuit.

What is claimed is:

1. A non-transitory machine-readable medium having stored thereon instructions, which if performed by a machine causes the machine to perform a method comprising:
    assigning an urgency of requests based on a priority level for incoming requests and associated entries in at least one priority queue, wherein the at least one priority queue includes first and second priority queues;
    assigning an urgency delta for anti-starvation that indicates urgency promotion to prevent starvation for the incoming requests in the at least one priority queue;
    determining conflict information including whether an incoming request is dependent on any request already present in the at least one queue;
    performing urgency inherency for all requests in the first priority queue that have a same address as an incoming request into the first priority queue;
    determining all contending requests within the at least one priority queue during a cycle; and
    sending a selected contending request to a memory controller for accessing memory.

2. The non-transitory machine-readable medium of claim 1, further comprising:
    selecting a contending request that is most urgent among all contending requests in the at least one priority queue based on the urgency and the urgency delta.

3. The non-transitory machine-readable medium of claim 1, further comprising:
    updating the urgency for each entry in the at least one priority queue every cycle based on the urgency delta for each entry.

4. The non-transitory machine-readable medium of claim 1, wherein determining conflict information including whether an incoming request is dependent on any request already present in the at least one queue comprises determining conflict information for each request and associated entry in the first and second priority queues by determining whether each incoming request for the first priority queue is dependent on any request that is already present in the first queue and by determining whether each incoming request for the second priority queue is dependent on any request that is already present in the second queue.

5. The non-transitory machine-readable medium of claim 4, further comprising: and performing urgency inherency for all requests in the second priority queue that have a same address as an incoming request into the second priority queue;
setting a disable field for an entry when an associated incoming request in the first priority queue depends upon another request in the first priority queue, wherein determining all contending requests within the at least one priority queue during a cycle comprises determining for each request whether the request is valid, not disabled, and has read or write credits available for a memory controller.

6. An apparatus comprising:
    an address conflict resolution circuit (ACRC), the ACRC to determine conflict information including whether an incoming request is dependent on any request already present in a priority queue; and
    the priority queue coupled to the ACRC, the priority queue to assign an urgency based on a priority level for incoming requests and associated entries in the priority queue, to assign an urgency delta for urgency promotion to prevent starvation for the incoming requests and to determine all contending requests within the priority queue during a cycle,
    wherein the priority queue to perform urgency inherency for all requests in the priority queue that have a same address as an incoming request into the priority queue.

7. The apparatus of claim 6, wherein the priority queue to select a contending request that is most urgent among all contending requests in the priority queue and to send the selected contending request to an arbiter, wherein the priority queue to update the urgency for each entry in the priority queue every cycle based on the urgency delta for each entry.

8. The apparatus of claim 7, wherein the ACRC to determine conflict information including whether an incoming request is dependent on any request already present in the priority queue based on determining whether an entry in a table of the ACRC has an address that matches an address of an incoming request, wherein each entry of the table of the ACRC includes an address field indicating an address of a request, a write count field indicating a number of writes in the priority queue to the address of the request, a read count field indicating a number of reads in the priority queue to the address of the request, a last write index indicating an index of a last write request to the address of the request in the priority queue, and a valid field indicating whether the entry is valid.

9. The apparatus of claim 8, wherein the priority queue to set a disable field for an entry when an associated incoming request in the priority queue depends upon another request in the priority queue, wherein the priority queue to determine all contending requests within the at least one priority queue during a cycle based on determining for each request whether the request is valid, not disabled, and has read or write credits available for a memory controller.

10. A system comprising:
    a first priority queue circuit to determine conflict information including whether an incoming request is dependent on any request already present in the first priority queue circuit, to assign an urgency based on a priority level for incoming requests and associated entries in the first priority queue circuit, to assign an urgency delta for urgency promotion to prevent starvation for the incoming requests, and to determine all contending requests within the first priority queue circuit during a cycle, wherein the first priority queue circuit to perform urgency inherency for all requests in the first priority queue circuit that have a same address as an incoming request into the first priority queue circuit;
a second priority queue circuit to determine all contending requests within the second priority queue circuit during the cycle; and
an arbiter to receive a first request from the first priority queue circuit and to receive a second request from the second priority queue circuit.

11. The system of claim 10, wherein the arbiter to compare a first urgency level of the first request with a second urgency level of the second request for the cycle, select the first request when the first urgency level is greater than the second urgency level and select the second request when the second urgency level is greater than the first urgency level, and send the selected request to a memory controller, wherein the arbiter to select one of the first and second requests based on weighted round-robin arbitration when the second urgency level is equal the first urgency level.

12. The system of claim 10, wherein the first priority queue circuit to select a contending request that is most urgent among all contending requests in the first priority queue circuit and to send the selected contending request to the arbiter, wherein the first priority queue circuit to update the urgency for each entry in the first priority queue circuit every cycle based on the urgency delta for each entry.

13. A processor comprising:
at least one processor core to execute instructions to process data;
a system agent unit coupled to the at least processor core, the system agent unit to receive requests from the at least one processor core; and
a memory aggregator coupled to the system agent unit, the memory aggregator includes a first priority queue circuit and a second priority queue circuit, wherein the first priority queue circuit to determine conflict information including whether an incoming request from the system agent unit is dependent on any request already present in the first priority queue circuit, to assign an urgency based on a priority level for incoming requests and associated entries in the first priority queue circuit, to assign an urgency delta for urgency promotion to prevent starvation for the incoming requests, and to determine all contending requests within the first priority queue circuit during a cycle,
wherein the first priority queue circuit to perform urgency inherency for all requests in the first priority queue circuit that have a same address as an incoming request into the first priority queue circuit.

14. The processor of claim 13, wherein the second priority queue circuit to receive requests from a request unit and to determine all contending requests within the second priority queue circuit during the cycle.

15. The processor of claim 14, wherein the memory aggregator further comprises an arbiter to receive a first request from the first priority queue circuit and to receive a second request from the second priority queue circuit.

16. The processor of claim 15, wherein the arbiter to compare a first urgency level of the first request with a second urgency level of the second request for the cycle, select the first request when the first urgency level is greater than the second urgency level and select the second request when the second urgency level is greater than the first urgency level, and send the selected request to a memory controller.

17. The processor of claim 13, wherein the first priority queue circuit to select a contending request that is most urgent among all contending requests in the first priority queue circuit and to send the selected contending request to the arbiter.

18. The processor of claim 13, wherein the first priority queue circuit to update the urgency for each entry in the first priority queue circuit every cycle based on the urgency delta for each entry.

\* \* \* \* \*